US012225324B2

(12) United States Patent
Lee et al.

(10) Patent No.: US 12,225,324 B2
(45) Date of Patent: Feb. 11, 2025

(54) ELECTRONIC DEVICE AND METHOD FOR PERFORMING FUNCTIONS OF VIDEO CALL AND CONTENTS USING EXTERNAL ELECTRONIC DEVICE

(71) Applicant: SAMSUNG ELECTRONICS CO., LTD., Suwon-si (KR)

(72) Inventors: Miyoung Lee, Suwon-si (KR); Donggoo Kang, Suwon-si (KR); Hyunjin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 17/991,207

(22) Filed: Nov. 21, 2022

(65) Prior Publication Data

US 2023/0164294 A1 May 25, 2023

Related U.S. Application Data

(63) Continuation of application No. PCT/KR2022/018021, filed on Nov. 15, 2022.

(30) Foreign Application Priority Data

Nov. 19, 2021 (KR) .................. 10-2021-0160055
Dec. 7, 2021 (KR) .................. 10-2021-0173655

(51) Int. Cl.
*H04N 7/14* (2006.01)
*A63F 13/31* (2014.01)
(Continued)

(52) U.S. Cl.
CPC ........... *H04N 7/147* (2013.01); *G06F 3/1423* (2013.01); *H04N 7/144* (2013.01); *A63F 13/31* (2014.09);
(Continued)

(58) Field of Classification Search
CPC .. H04N 7/147; H04N 7/144; H04N 2007/145; H04N 7/14; H04N 21/431;
(Continued)

(56) References Cited

U.S. PATENT DOCUMENTS

2009/0267952 A1 10/2009 Yan et al.
2010/0121900 A1 5/2010 Sakai et al.
(Continued)

FOREIGN PATENT DOCUMENTS

CN  113497909  10/2021
JP  2007-274023  10/2007
(Continued)

OTHER PUBLICATIONS

Search Report dated Feb. 20, 2023 in International Patent Application No. PCT/KR2022/018021.
(Continued)

*Primary Examiner* — Yosef K Laekemariam
(74) *Attorney, Agent, or Firm* — Nixon & Vanderhye, P.C.

(57) ABSTRACT

An electronic device includes a communication module, a display, a memory, and at least one processor connected to the communication module, the display, and the memory. The at least one processor is configured to identify an external electronic device connectable to the electronic device based on video calling and content execution, identify at least one function executable in the external electronic device among functions associated with video calling and content execution, identify, based on device configuration information of the electronic device and device configuration information of the external electronic device, a function to be executed in the external electronic device among the at least one function executable in the external electronic device, and transmit, to the external electronic device via the
(Continued)

communication module, information corresponding to the function to be executed in the external electronic device.

18 Claims, 19 Drawing Sheets

(51) Int. Cl.
*G06F 3/0482* (2013.01)
*G06F 3/14* (2006.01)

(52) U.S. Cl.
CPC ...... *G06F 3/0482* (2013.01); *H04N 2007/145* (2013.01)

(58) Field of Classification Search
CPC .. H04N 21/4316; H04N 21/436; H04N 21/81; H04N 21/478; H04N 7/15; H04N 21/4223; H04N 21/4788; H04N 3/1423; G06F 3/14; G06F 3/0482; G06F 3/1454; A63F 13/31; G09G 2340/0442; G09G 2340/0492; G09G 2340/145
See application file for complete search history.

(56) References Cited

U.S. PATENT DOCUMENTS

| | | |
|---|---|---|
| 2011/0231791 A1 | 9/2011 | Itahana |
| 2014/0188985 A1 | 7/2014 | Park et al. |
| 2015/0160913 A1 | 6/2015 | Lee |
| 2015/0304604 A1 | 10/2015 | Sharma |
| 2017/0131962 A1* | 5/2017 | Lee ................ G06F 3/1454 |
| 2017/0239569 A1 | 8/2017 | Shiraiwa et al. |
| 2021/0168431 A1 | 6/2021 | Choi et al. |
| 2021/0203878 A1 | 7/2021 | Lee et al. |
| 2022/0006894 A1* | 1/2022 | Lee ................ H04M 1/72469 |
| 2023/0216990 A1 | 7/2023 | Fang et al. |

FOREIGN PATENT DOCUMENTS

| | | |
|---|---|---|
| JP | 2013-021711 | 1/2013 |
| KR | 10-2009-0050813 | 5/2009 |
| KR | 10-2012-0037813 | 4/2012 |
| KR | 10-2014-0071132 | 6/2014 |
| KR | 10-2014-0110664 | 9/2014 |
| KR | 10-2015-0067521 | 6/2015 |
| KR | 10-2016-0016544 | 2/2016 |
| KR | 10-2020-0037192 | 4/2020 |
| KR | 10-2020-0040554 | 4/2020 |
| KR | 10-2021-0086103 | 7/2021 |

OTHER PUBLICATIONS

Written Opinion dated Feb. 20, 2023 in International Patent Application No. PCT/KR2022/018021.

Extended Search Report dated Nov. 15, 2024 in European Patent Application No. 22896033.2.

* cited by examiner

ELECTRONIC DEVICE AND METHOD FOR PERFORMING FUNCTIONS OF VIDEO CALL AND CONTENTS USING EXTERNAL ELECTRONIC DEVICE

CROSS-REFERENCE TO RELATED APPLICATIONS

This application is a continuation of PCT/KR2022/018021, filed on Nov. 15, 2022, at the Korean Intellectual Property Receiving Office and claims priority under 35 U.S.C. § 119 to Korean Patent Application No. 10-2021-0160055, filed on Nov. 19, 2021 at the Korean Intellectual Property Office, and to Korean Patent Application No. 10-2021-0173655, filed on Dec. 7, 2021 at the Korean Intellectual Property Office, the disclosures of each which are incorporated by reference herein in their entireties.

BACKGROUND

Field

The disclosure relates to performing of a function using an external electronic device by an electronic device.

Description of Related Art

Since electronic devices have become smart, the types of external electronic devices connectable to an electronic device has been diversified. Further, the function of an electronic device is capable of being performed by an external electronic device via a connection between the electronic device and the external electronic device. For example, while executing a single application, an electronic device may execute, via an external electronic device, functions such as an input function, an output function, and/or a processing function associated with the application being executed.

SUMMARY

A recent electronic device may simultaneously execute a plurality of applications. For example, while performing a multilateral video call via a video call application, an electronic device (e.g., a smartphone) may execute content via a content application, and share, via the video call, content execution information with a plurality of users that are in the video call. Functions associated with a video call may be designated functions. However, functions related to content executed during the video call may differ depending on a content context (e.g., a content format, a content type, and/or a content progress situation).

According to a conventional art, an electronic device may perform functions associated with a video call via an external electronic device as designated functions. However, content executed during the video call may vary, and functions related to content vary for each content and thus the functions may not be performed via the external electronic device.

According to an embodiment, an electronic device that identifies a function associated with content executed during a video call, in addition to a function associated with a video call, when the content is executed during the video call, and selects an optimal function performable in an external electronic device among the functions associated with video calling and content execution so that the external electronic device performs the same is provided, along with a method of performing, by an electronic device, a video call and content function using an external electronic device.

According to an embodiment, an electronic device that identifies context information (e.g., a content format, a content type, and/or a content progress state) of content in the case in which a display function is performed by an external electronic device among functions associated with video calling and content execution when the content is executed during the video call, and displays a video call and content execution screen in the external electronic device in a layout based on the context information of the content, along with a method of performing a video call and content function using an external electronic device by an electronic device.

According to an embodiment of the disclosure, an electronic device may include a communication module, a display, a memory, and at least one processor connected to the communication module, the display, and the memory, and the at least one processor may be configured to identify an external electronic device connectable to the electronic device based on video calling and content execution, identify at least one function executable in the external electronic device among functions associated with video calling and content execution, identify, based on device configuration information of the electronic device and device configuration information of the external electronic device, a function to be executed in the external electronic device among the at least one function executable in the external electronic device, and transmit, to the external electronic device via the communication module, information corresponding to the function to be executed in the external electronic device.

According to an embodiment of the disclosure, a method of performing, by an electronic device, a video call and content function using an external electronic device, may include identifying, based on video calling and content execution, an external electronic device connectable to the electronic device, identifying at least one function executable in the external electronic device among functions associated with video calling and content execution, identifying, based on device configuration information of the electronic device and device configuration information of the external electronic device, a function to be executed in the external electronic device among the at least one function executable in the external electronic device, and transmitting, to the external electronic device, information corresponding to the function to be executed in the external electronic device via a communication module of the electronic device.

According to an embodiment of the disclosure, a non-transitory computer-readable recording medium stores instructions, and the instructions, when executed by at least one processor of an electronic device, cause the electronic device to perform operations including identifying an external electronic device connectable to the electronic device based on video calling and content execution, identifying at least one function executable in the external electronic device among functions associated with video calling and content execution, identifying, based on device configuration information of the electronic device and device configuration information of the external electronic device, a function to be executed in the external electronic device among the at least one function executable in the external electronic device, and transmitting, to the external electronic device via the communication module, information corresponding to the function to be executed in a external electronic device of the electronic device.

According to an embodiment, a function associated with content executed while a video call is performed may be identified, in addition to a function associated with the video call when the content is executed during the video call, and a function (e.g., an optimal function) performable in the external electronic device may be selected from among functions associated with video calling and content execution, so that the external electronic device is capable of performing the function.

According to an embodiment, in a case in which a display function is performed by an external electronic device among functions associated with video calling and content execution when content is executed during the video call, context information (e.g., a content format, a content type, and/or a content progress state) of the content may be identified, and a video call and content execution screen may be displayed in the external electronic device in a layout based on the context information of the content. Thus, each video caller may be capable of appreciating content in a layout appropriate for the situation of the corresponding video caller.

Effects obtainable based on the disclosure are not limited to the above-described effects, and other effects, which are not mentioned above, may be appreciated based on the descriptions provided below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Identical or like reference numerals in the drawings denote identical or like elements.

DETAILED DESCRIPTION

The terms used in this disclosure are merely used for describing various embodiments, and are not intended to limit the scope of other embodiments. As used herein, the singular forms are intended to include the plural forms as well, unless the context clearly indicates otherwise. All terms used herein, including technical or scientific terms, may have the equivalent meaning as the meaning generally understood by those skilled in the art of the disclosure. The terms defined in a generally used dictionary may be interpreted as having a meaning that is the same as or similar to the meaning that the context of related technology has, and may not be construed as an ideal or excessively formal meaning unless clearly defined otherwise. Depending on the case, a term that is defined even in the disclosure may not be interpreted to exclude the embodiments of the disclosure.

Figure 1:
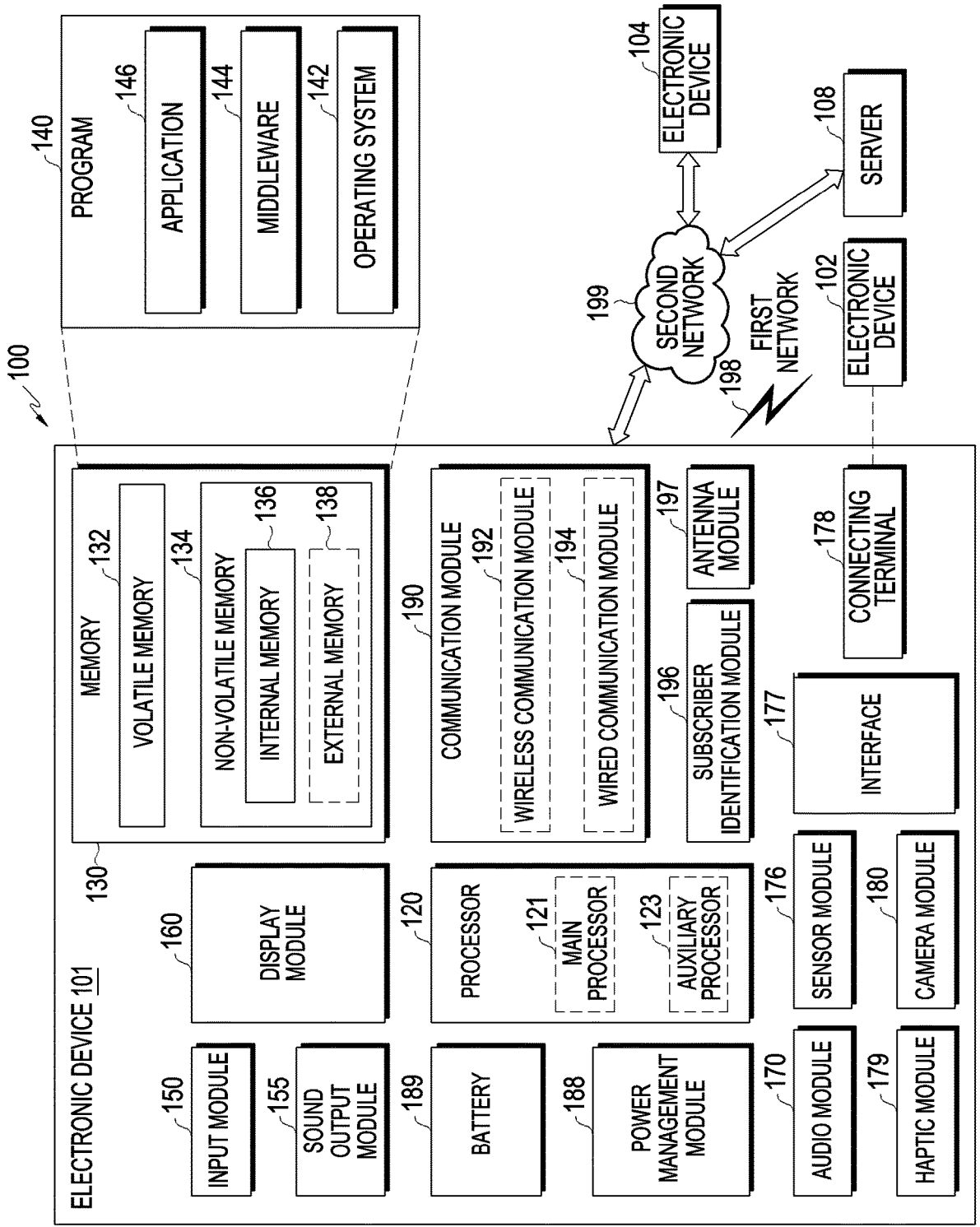
FIG. 1 is a block diagram illustrating an example electronic device in a network environment according to an embodiment.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
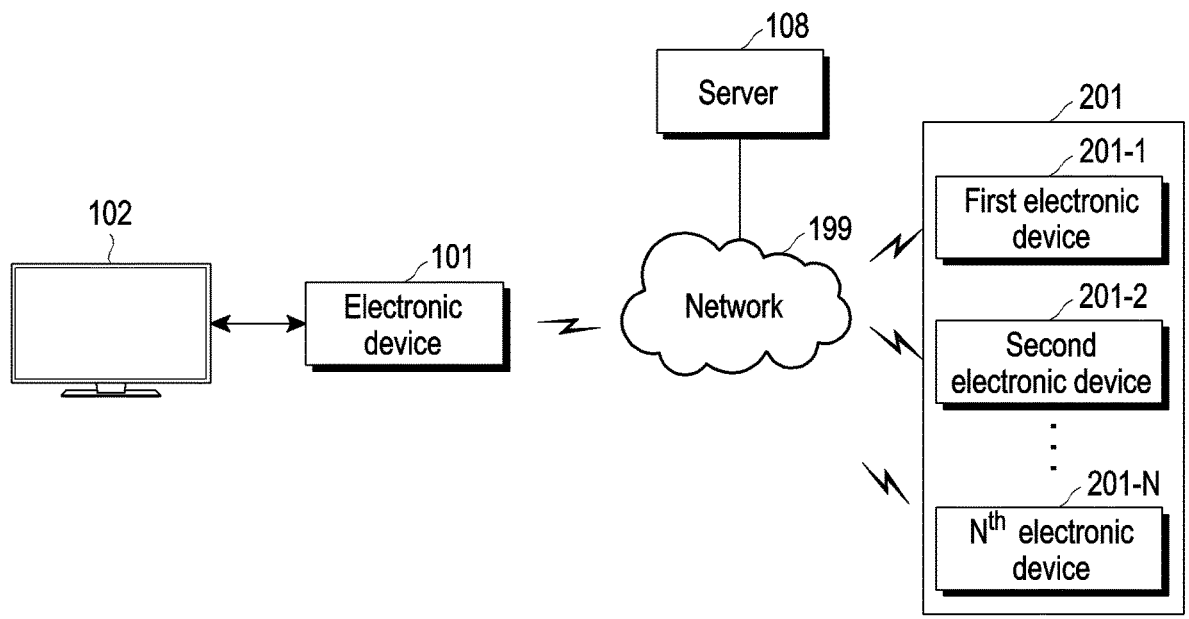
FIG. 2 is a diagram illustrating an example electronic device, an example external electronic device, and an example video call server according to an embodiment.

FIG. 2 is a diagram illustrating an example electronic device, an example external electronic device, and an example video call server according to an embodiment.

Referring to FIG. 2, the electronic device 101 according to an embodiment may communicate with a server 108 (e.g., a video call server) via a network 199. The server 108 according to an embodiment may provide, for example, a multilateral video call service. The electronic device 101 according to an embodiment may perform, for example, a multilateral video call with electronic devices 201: 201-1, 201-2, ... 201-N of at least one partner (or multiple partners) via the server 108. The electronic device 101 according to an embodiment may execute content (e.g., a game application, a video streaming application, and/or other applications executable in the electronic device 101) while performing a video call with at least one partner electronic device 201, may share information associated with content execution with the at least one partner electronic device 201 while performing a video call, and/or may relay information associated with content execution to each of the at least one partner device 201 while performing a video call.

The electronic device 101 according to an embodiment may identify at least one external electronic device 102 that is connected or connectable to the electronic device 101 when the electronic device 101 executes (shares (or relays)) content while performing a video call with at least one partner electronic device 201. For example, the electronic device 101 may be a mobile phone, and the external electronic device 102 may be a TV, a speaker, a microphone, a camera, a sensor, an input device, and/or a wearable device connected or connectable to the electronic device 101, and may further include another electronic device interoperable with a mobile phone.

In a case of executing content while performing a video call, the electronic device 101 according to an embodiment may identify at least one function executable in the external electronic device 102 that is connected or connectable to the electronic device 101 among functions associated with video calling and content execution. For example, in a case of executing a content while performing a video call, the electronic device 101 may identify at least one function executable in each of a plurality of external electronic devices among the functions associated with video calling and content execution, if a plurality of external electronic devices connected or connectable are present. According to an embodiment, functions associated with video calling and content execution may include functions associated with a video call and functions associated with content execution. For example, the functions associated with a video call may include, but are not limited to, a video call screen display function, a selfie camera function, a video call voice output function, a microphone input function and/or other functions associated with a video call, and the functions associated with content execution may include, but are not limited to, a content screen display function, a content sound output function, a content-related input function, a content-related camera function, a content-related sensing function, and/or other functions associated with a content. Based on device configuration information of the electronic device 101 and device configuration information of the external electronic device 102 (or based on user selection), the electronic device 101 according to an embodiment may identify at least one function to be executed in the external electronic device 102 among the functions associated with video calling and content execution. For example, the device configuration information of the electronic device 101 may include information associated with hardware components included in the electronic device 101 (or constituting the electronic device 101), and the device configuration information of the external electronic device 102 may include information associated with hardware components included in the external electronic device 102 (or constituting the external electronic device 102). For example, the hardware component information may include the type of hardware component and specification information. For example, the type of hardware component may further include a display, a microphone, a speaker, a camera, a sensor, an input device, and/or other hardware components capable of being included in the electronic device 101. For example, the specification information of hardware components may include information associated with the specifications of a display, the specifications of a microphone, the specifications of a speaker, the specifications of a camera, the specifications of a sensor, and/or the specifications of an input device. The electronic device 101 according to an embodiment may obtain hardware component information of each of the at least one external electronic device via a server (not illustrated) that provides information associated with at least one external electronic device connectable to the electronic device 101, or may obtain hardware component information of each of the at least one external electronic device via communication with each of the at least one external electronic device.

The electronic device 101 according to an embodiment may compare the hardware component information of the electronic device 101 and the hardware component information of the external electronic device 102, and may identify a hardware component more suitable for (e.g., having faster or better performance or having a processing rate equal to or exceeding a predetermined processing rate or having a performance equal to or exceeding some performance standard, etc.) performing each of the functions associated with video calling and content execution among the hardware components of the electronic device 101 and the hardware components of the external electronic device 102. For example, the electronic device 101 may obtain optimal specification information for executing each of the functions associated with video calling and content execution, and may identify, based on the optimal specification information, a hardware component optimized for (or having a faster processing rate or a better performance or having a processing rate equal to or exceeding a predetermined processing rate or having a performance equal to or exceeding some performance standard, etc.) performing each of the functions associated with video calling and content execution among the hardware components of the electronic device 101 and the hardware components of the external electronic device 102. For example, based on a hardware component more optimized for performing each of the functions associated with video calling and content execution among the hardware components of the electronic device 101 and the hardware components of the external electronic device 102, the electronic device 101 may identify a function to be performed in the external electronic device 102 among the functions associated with video calling and content execution. For example, based on the hardware component more optimized for performing each of the functions associated with video calling and content execution among the hardware components of the electronic device 101 and the hardware components of the external electronic device 102, the electronic device 101 may distribute the functions associated with video calling and content execution to a function to be executed in the electronic device 101 and a function to be executed in the external electronic device 102. The electronic device 101 according to an embodiment may transmit, to the external electronic device, information corresponding to the function to be executed in the external electronic device 102. Based on the information received from the electronic device 101, the external electronic device 102 may perform the function distributed from the electronic device 101.

While video calling and content execution are performed, if the function to be executed in the external electronic device 102 is a function of displaying a video call and content execution screen, the electronic device 101 according to an embodiment may identify context information of content. For example, the context information of the content may include a content format, a content type, a content progress state, and/or content participant information. For example, the content format may include a tournament (or competition) format, a lecture (or class) format, a sharing (or friendship) format, and/or other formats. The content type may include a game (or sports), an exercise (or dance), a concert (or show), and/or other types of contents. The content progress state may include a score (or mark) state, a victory-or-defeat state, progress/end state, and/or other states. The content participant information may include information associated with a user or an electronic device that participates in content.

The electronic device 101 according to an embodiment may identify, based on the context information of the content, the display layout of a video call and content execution screen to be displayed in the external electronic device 102. The electronic device 101 according to an embodiment may transmit information associated with the video call and content execution screen to the external electronic device 102 based on the display layout of the video call and content execution screen. The external electronic device 102 according to an embodiment may display, on a display, the video call and content execution screen in a predetermined display layout provided from the electronic device 101.

The electronic device 101 according to an embodiment may identify a change in the content context information while transmitting, to the external electronic device based on the content context information, information associated with a first video call and content execution screen provided in a first display layout. Based on the change in the content context information, the electronic device 101 according to an embodiment may transmit, to the external electronic device, information associated with a second video call and content execution screen in a second display layout. Accordingly, the external electronic device 102 may display a video call and content execution screen of which the layout is changed according to the change in the content context information. In the same manner as the electronic device 101, each of the at least one partner electronic device 201 according to an embodiment may enable some of the functions associated with video calling and content execution to be performed in at least one external electronic device (not illustrated) by connecting to the at least one external electronic device (not illustrated).

Figure 3:
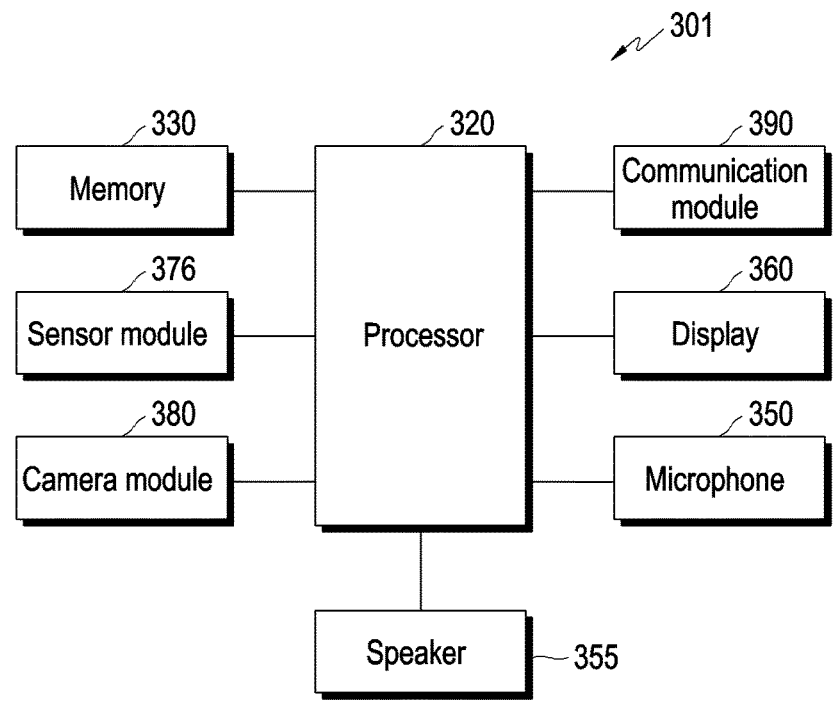
FIG. 3 is a block diagram illustrating an example electronic device according to an embodiment.

FIG. 3 is a block diagram illustrating an example electronic device according to an embodiment.

Referring to FIG. 3, an electronic device 301 (e.g., the electronic device 101 of FIG. 1) according to an embodiment may include at least one processor 320, a memory 330, a microphone 350, a speaker 355, a display 360, a sensor module 376, a camera module 380, and/or a communication module 390. The electronic device 301 according to an embodiment is not limited to the components illustrated in FIG. 3, and may be configured to include additional components or to exclude some of the components shown in FIG. 3. The electronic device 301 according to an embodiment may further include the whole or part of the electronic device 101 illustrated in FIG. 1.

A processor (or at least one processor) 320 (e.g., the processor 120 of FIG. 1) (e.g., including processing circuitry) according to an embodiment may control overall operation of the component elements included in the electronic device 301. The processor 320 according to an embodiment may perform a video call with at least one partner electronic device 201 via the server 108 by executing a video call application, and may execute content (e.g., a game application, a video streaming application, and/or other applications executable in the electronic device 101) while performing the video call. The processor 320 according to an embodiment may share information associated with content execution with at least one partner electronic device 201 while performing a video call, or may relay a content progress state to at least one partner electronic device 201 while performing a video call.

When executing (sharing (or relaying)) content while performing a video call with at least one partner electronic device 201, the processor 320 according to an embodiment may identify at least one external electronic device 102 that is connected or connectable to the electronic device 101. For example, the processor 320 may execute content while performing a video call by communicating with the server 108 via the second network 199 (e.g., a long-range communication network such as a legacy cellular network, a 5G network, a next generation communication network (e.g., a new radio (NR) access technology), the Internet, or a computer network (e.g., LAN or WAN)), and may identify at least one external electronic device 102 that is connected or connectable to the electronic device 101 via the first network 198 (e.g., a short-range communication network such as Bluetooth, wireless fidelity (WiFi) direct, or infrared data association (IrDA)). For example, the processor 320 may receive, from an external server via the second network 199, information associated with at least one external electronic device 102 connected or connectable to the electronic device 101.

When executing content while performing a video call, the processor 320 according to an embodiment may identify functions associated with video calling and content execution, and may identify at least one function executable in the external electronic device 102 among the functions associated with video calling and content execution. For example, when a plurality of external electronic devices 102 are present, the processor 320 may identify at least one function executable in each of the plurality of external electronic devices among the functions associated with video calling and content execution. According to an embodiment, functions associated with video calling and content execution may include functions associated with a video call and functions associated with content execution. For example, the functions associated with a video call may include, but are not limited to, a video call screen display function, a selfie camera function, a video call voice output function, a microphone input function and/or other functions associated with a video call, and the functions associated with content execution may include, but are not limited to, a content screen display function, a content sound output function, a content-related input function, a content-related camera function, a content-related sensing function, and/or other functions associated with a content. Based on device configuration information of the electronic device 101 and/or device configuration information of the external electronic device 102 (or based on user selection), the processor 320 according to an embodiment may identify at least one function to be executed in the external electronic device 102 among the function(s) associated with video calling and content execution. For example, the device configuration information of the electronic device 101 may include information associated with hardware components included in the electronic device 101 (or constituting the electronic device 101), and the device configuration information of the external electronic device 102 may include information associated with hardware components included in the external electronic device 102 (or constituting the external electronic device 102). For example, the hardware component information may include the type of hardware component and specification information. For example, the type of hardware component may further include a display, a microphone, a speaker, a camera, a sensor, an input device, and/or other hardware components capable of being included in the electronic device 101. For example, the specification information of a hardware component may include information associated with the specifications of a display, the specifications of a microphone, the specifications of a speaker, the specifications of a camera, the specifications of a sensor, and/or the specifications of an input device. The processor 320 according to an embodiment may obtain hardware component information of each of at least one external electronic device via a server (not illustrated) that provides information associated with at least one external electronic device connectable to the electronic device 101, or may obtain hardware component information of each of the at least one external electronic device via communication with each of the at least one external electronic device.

The processor 320 according to an embodiment may compare the hardware component information of the electronic device 101 and the hardware component information of the external electronic device 102, and may identify a hardware component more suitable for (or having faster or better performance for) performing each of the functions associated with video calling and content execution among the hardware components of the electronic device 101 and the hardware components of the external electronic device 102. For example, the electronic device 101 may obtain optimal specification information for executing each of the functions associated with video calling and content execution, and may identify, based on the optimal specification information, a hardware component more optimized for (or having a faster processing rate or a better performance or having a processing rate equal to or exceeding a predetermined processing rate or having a performance equal to or exceeding some performance standard, etc.) performing each of the functions associated with video calling and content execution among the hardware components of the electronic device 101 and the hardware components of the external electronic device 102. For example, based on a hardware component more optimized for performing each of the functions associated with video calling and content execution among the hardware components of the electronic device 101 and the hardware components of the external electronic device 102, the processor 320 may identify a function to be performed in the external electronic device 102 among the functions associated with video calling and content execution. For example, based on a hardware component more optimized for performing each of the functions associated with video calling and content execution among the hardware components of the electronic device 101 and the hardware components of the external electronic device 102, the processor 320 may distribute the functions associated with video calling and content execution as a function to be executed in the electronic device 101 and a function to be executed in the external electronic device 102. The processor 320 according to an embodiment may transmit information corresponding to the function to be executed in the external electronic device 102 to the external electronic device 102 via the communication module 390. Based on the information received from the electronic device 101, the external electronic device 102 may perform the function distributed from the electronic device 101.

While video calling and content execution are performed, if the function to be executed in the external electronic device 102 is a function of displaying a video call and content execution screen, the processor 320 according to an embodiment may identify the context information of content. For example, the context information of the content may include a content format, a content type, a content progress state, and/or content participant information. For example, the content format may include a tournament (or competition) format, a lecture (or class) format, a sharing (or friendship) format, and/or other formats. The content type may include a game (or sports), an exercise (or dance), a concert (or show), and/or other types. The content progress state may include a score (or mark) state, a victory-or-defeat state, a progress/end state, and/or other states. The content participant information may include information associated with a user or an electronic device that is participating in a content.

Based on the content context information, for example, a content format, a content type, a content progress state, and/or content participant information, the processor 320 according to an embodiment may identify (or designate) a display layout for a video call and content execution screen to be displayed in the external electronic device 102. The processor 320 according to an embodiment may transmit, based on the identified (or designated) display layout, information associated with the video call and content execution screen to the external electronic device 102. The external electronic device 102 (or at least one processor of the external electronic device 102) according to an embodiment may display, on a display, the video call and content execution screen in the designated display layout provided from the electronic device 101.

The processor 320 according to an embodiment may identify a change in the content context information while transmitting, to the external electronic device 102 based on the content context information, information associated with a first video call and content execution screen provided in a first display layout. For example, the processor 320 may identify a change in a content format, a content type, a content progress state, and/or content participant information. Based on the change in the content context information, the processor 320 according to an embodiment may transmit, to the external electronic device 102, information associated with a second video call and content execution screen provided in a second display layout. Accordingly, the external electronic device 102 may display a video call and content execution screen of which the layout is changed according to the change in the content context information.

The memory 330 (e.g., the memory 130 of FIG. 1) according to an embodiment may store an application program and data. For example, the memory 330 may store an application (a function or a program) associated with the operation of the processor 320 of the electronic device 301. For example, the memory 330 may store a video call application and a content application. The memory 330 according to an embodiment may store various types of data generated while the program 140 is executed, in addition to a program (e.g., the program 140 of FIG. 1) used for performing a function. The memory 330 may include a program area 140 and a data area (not illustrated). The program area 140 may store program information related to operating the electronic device 301, such as an operating system (OS) (e.g., the operating system 142 of FIG. 1) that boots up the electronic device 301. The data area (not illustrated) may store transmitted and/or received data and generated data according to an embodiment. Also, the memory 330 may include at least one storage medium from among flash memory, hard disk, multimedia card micro type memory (e.g., secure digital (SD) or extreme digital (XD) memory), RAM, and ROM.

The microphone 350 (e.g., the input module 150 of FIG. 1) according to an embodiment may receive sound input. For example, the microphone 350 may receive sound (e.g., voice) associated with video calling and content execution based on the control performed by the processor 320.

The speaker 355 (e.g., the sound output module 155 of FIG. 1) according to an embodiment may output sound. For example, the speaker 355 may output a video call sound and/or a content sound based on the control performed by the processor 320.

The display 360 (the display module 160 of FIG. 1) according to an embodiment may include a display, a hologram device, or a projector, and a control circuit for controlling the corresponding device. According to an embodiment, the display module 360 may include a touch sensor configured to detect a touch, or a pressure sensor configured to measure the strength of a force given by the touch. The display 360 according to an embodiment may display a video call and content execution screen. For example, the video call and content execution screen may include a video call screen and/or a content execution screen.

The sensor module 376 (e.g., the first sensor module 176 of FIG. 1) (e.g., including one or more sensors) according to an embodiment may detect an operation state (e.g., power or temperature) of the electronic device 101 or an external environmental state (e.g., a user state), and may produce an electric signal or a data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor, may detect an operation state (power or temperature) of the electronic device 101 in association with video calling and content execution, and may produce an electric signal or a data value corresponding to the detected state.

The camera module 380 (e.g., the camera module 180 of FIG. 1) (e.g., including a camera) according to an embodiment may perform shooting associated with execution of a video call and/or content, and may provide the shot image to the processor 320. For example, the camera module 380 may perform shooting to obtain a selfie image based on a selfie function while performing a video call.

Based on the control performed by at least one processor 320, the communication module 390 (e.g., the communication module 190 of FIG. 1) (e.g., including communication circuitry) according to an embodiment may communicate with the external electronic device 102 via the first network 198 (e.g., a short-range communication network such as Bluetooth, wireless fidelity (WiFi) direct, or infrared data association (IrDA)), or may communicate with the server 108 and/or each of the at least one partner electronic device 201 via the second network 199 (e.g., a long-range communication network such as a legacy cellular network, a 5G network, a next generation communication network (e.g., new radio (NR) access technology), the Internet, or a computer network (e.g., an LAN or WAN)).

According to an embodiment, the configuration of the electronic device 301 is not limited to the configuration illustrated in FIG. 3, and may further include various components. According to an embodiment, the electronic device 301 may further include an image processing module (not illustrated). The image processing module may perform a 2D or 3D image processing and/or rendering operation based on the control performed by the processor 320.

In the above-described embodiments, the main components of an electronic device have been described through the electronic device 301 of FIG. 3. However, in an embodiment, not all the components illustrated in FIG. 3 are required, and the electronic device 301 may be embodied by including more components than the components of FIG. 3 or the electronic device 301 may be embodied by including fewer components.

According to an embodiment, an electronic device (e.g., the electronic device 101 of FIG. 1 or electronic device 301 of FIG. 3) may include a communication module, a display, a memory, and at least one processor connected to the communication module, the display, and the memory, and the at least one processor may be configured to identify an external electronic device connectable to the electronic device based on video calling and content execution, to identify at least one function executable in the external electronic device among functions associated with video calling and content execution, to identify, based on device configuration information of the electronic device and device configuration information of the external electronic device, a function to be executed in the external electronic device among the at least one function executable in the external electronic device, and to transmit, to the external electronic device via the communication module, information corresponding to the function to be executed in the external electronic device.

According to an embodiment, the functions associated with video calling and content execution may include functions associated with a video call and functions associated with execution of content.

According to an embodiment, the functions associated with a video call may include a video call screen display function, a selfie-camera function, a video call voice output function, and/or a microphone input function.

According to an embodiment, the functions associated with execution of content may include a content screen display function, a content sound output function, a content-related input function, a content-related camera function, and/or a content-related sensing function.

According to an embodiment, the device configuration information of the electronic device may include information associated with hardware components included in the electronic device, and the device configuration information of the external electronic device may include information associated with hardware components included in the external electronic device.

According to an embodiment, the at least one processor may be configured to identify context information of content in a case in which the function to be executed in the external electronic device is a function of displaying a video call and content execution screen, to identify a display layout of the video call and content execution screen based on the context information of the content, and to transmit, based on the identified display layout, information associated with the video call and content execution screen to the external electronic device.

According to an embodiment, the context information of the content may include at least one of a content format, a content type, or a content progress state.

According to an embodiment, the at least one processor may be configured to identify a change in the context information of the content while a first video call and content execution screen is displayed in a first display layout, to identify a second display layout based on the change in the context information of the content, and to display the first video call and content execution screen in the second display layout.

According to an embodiment, the external electronic device may include a TV.

Figure 4:
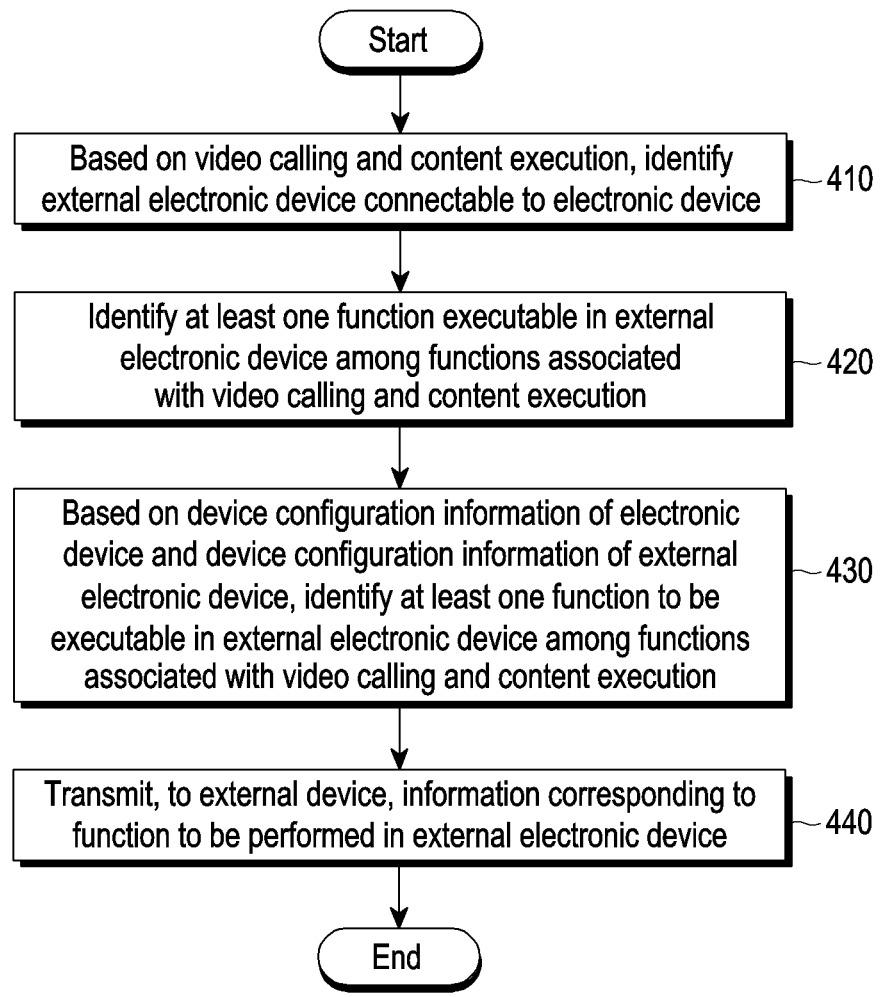
FIG. 4 is a flowchart illustrating an example operation of distributing functions associated with video calling and content execution using an external electronic device when video calling and content execution are performed in an example electronic device according to an embodiment

FIG. 4 is a flowchart illustrating an example operation of distributing functions associated with video calling and content execution using an external electronic device when video calling and content execution are performed in an example electronic device according to an embodiment.

Referring to FIG. 4, a processor (e.g., the processor 120 of FIG. 1 or the electronic device 320 of FIG. 3) of an electronic device (e.g., the electronic device 101 of FIG. 1 or the electronic device 301 of FIG. 3) according to various embodiments may perform at least one operation among operations 410, 420, 430, and 440.

In operation 410, based on video calling and content execution, the processor 320 according to an embodiment may identify an external electronic device (e.g., the external electronic device 102 of FIG. 1 and FIG. 2) connectable to an electronic device. For example, when executing (sharing (or relaying)) content while performing a video call with at least one partner electronic device 201 via the video call server 108, the processor 320 may identify at least one external electronic device 102 that is connected or connectable to the electronic device 101. For example, the processor 320 may execute content while performing a video call by communicating with the server 108 via the second network 199 (e.g., a long-range communication network such as a legacy cellular network, a 5G network, a next generation communication network (e.g., a new radio (NR) access technology), Internet, or a computer network (e.g., LAN or WAN)), and may identify at least one external electronic device 102 that is connected or connectable to the electronic device 101 via the first network 198 (e.g., a short-range communication network such as Bluetooth, wireless fidelity (WiFi) direct, or infrared data association (IrDA)). For example, the processor 320 may receive, from an external server via the second network 199, information associated with at least one external electronic device 102 connected or connectable to the electronic device 101.

In operation 420, the processor 320 according to an embodiment may identify functions associated with video calling and content execution, and may identify at least one function executable in the external electronic device 102 among the functions associated with video calling and content execution. For example, when a plurality of external electronic devices 102 are present, the processor 320 may identify at least one function executable in each of the plurality of external electronic devices among the functions associated with video calling and content execution. According to an embodiment, functions associated with video calling and content execution may include functions associated with a video call and functions associated with content execution. For example, the functions associated with a video call may include, but are not limited to, a video call screen display function, a selfie camera function, a video call voice output function, a microphone input function and/or other functions associated with a video call, and the functions associated with content execution may include, but are not limited to, a content screen display function, a content sound output function, a content-related input function, a content-related camera function, a content-related sensing function, and/or other functions associated with a content.

In operation 430, based on device configuration information of the electronic device 101 and device configuration information of the external electronic device 102 (or based on user selection), the processor 320 according to an embodiment may identify at least one function to be executed in the external electronic device 102 among the functions associated with video calling and content execution. For example, the device configuration information of the electronic device 101 may include information associated with hardware components included in the electronic device 101 (or constituting the electronic device 101), and the device configuration information of the external electronic device 102 may include information associated with hardware components included in the external electronic device 102 (or constituting the external electronic device 102). For example, the hardware component information may include the type of hardware component and specification information. For example, the type of hardware component may further include a display, a microphone, a speaker, a camera, a sensor, an input device, and/or other hardware components capable of being included in the electronic device 101. For example, the specification information of a hardware component may include information associated with the specifications of a display, the specifications of a microphone, the specifications of a speaker, the specifications of a camera, the specifications of a sensor, and/or the specifications of an input device. The processor 320 according to an embodiment may obtain hardware component information of each of at least one external electronic device via a server (not illustrated) that provides information associated with at least one external electronic device connectable to the electronic device 101, or may obtain hardware component information of each of the at least one external electronic device via communication with each of the at least one external electronic device. The processor 320 according to an embodiment may compare the hardware component information of the electronic device 101 and the hardware component information of the external electronic device 102, and may identify a hardware component more suitable for (e.g., having faster or better performance or having a processing rate equal to or exceeding a predetermined processing rate or having a performance equal to or exceeding some performance standard, etc.) performing each of the functions associated with video calling and content execution among the hardware components of the electronic device 101 and the hardware components of the external electronic device 102. For example, the electronic device 101 may obtain optimal specification information for executing each of the functions associated with video calling and content execution, and may identify, based on the optimal specification information, a hardware component optimized for (e.g., having a faster processing rate or a better performance or having a processing rate equal to or exceeding a predetermined processing rate or having a performance equal to or exceeding some performance standard, etc.) performing each of the functions associated with video calling and content execution among the hardware components of the electronic device 101 and the hardware components of the external electronic device 102. For example, based on the hardware component more optimized for performing each of the functions associated with video calling and content execution among the hardware components of the electronic device 101 and the hardware components of the external electronic device 102, the processor 320 may identify a function to be performed in the external electronic device 102 among the functions associated with video calling and content execution. For example, based on the hardware component more optimized for performing each of the functions associated with video calling and content execution among the hardware components of the electronic device 101 and the hardware components of the external electronic device 102, the processor 320 may distribute the functions associated with video calling and content execution as a function to be executed in the electronic device 101 and a function to be executed in the external electronic device 102.

In operation 440, the processor 320 according to an embodiment may transmit information corresponding to the function to be executed in the external electronic device 102 to the external electronic device 102 via the communication module 390. Based on the information received from the electronic device 101, the external electronic device 102 may perform the function distributed from the electronic device 101.

Figure 5A:
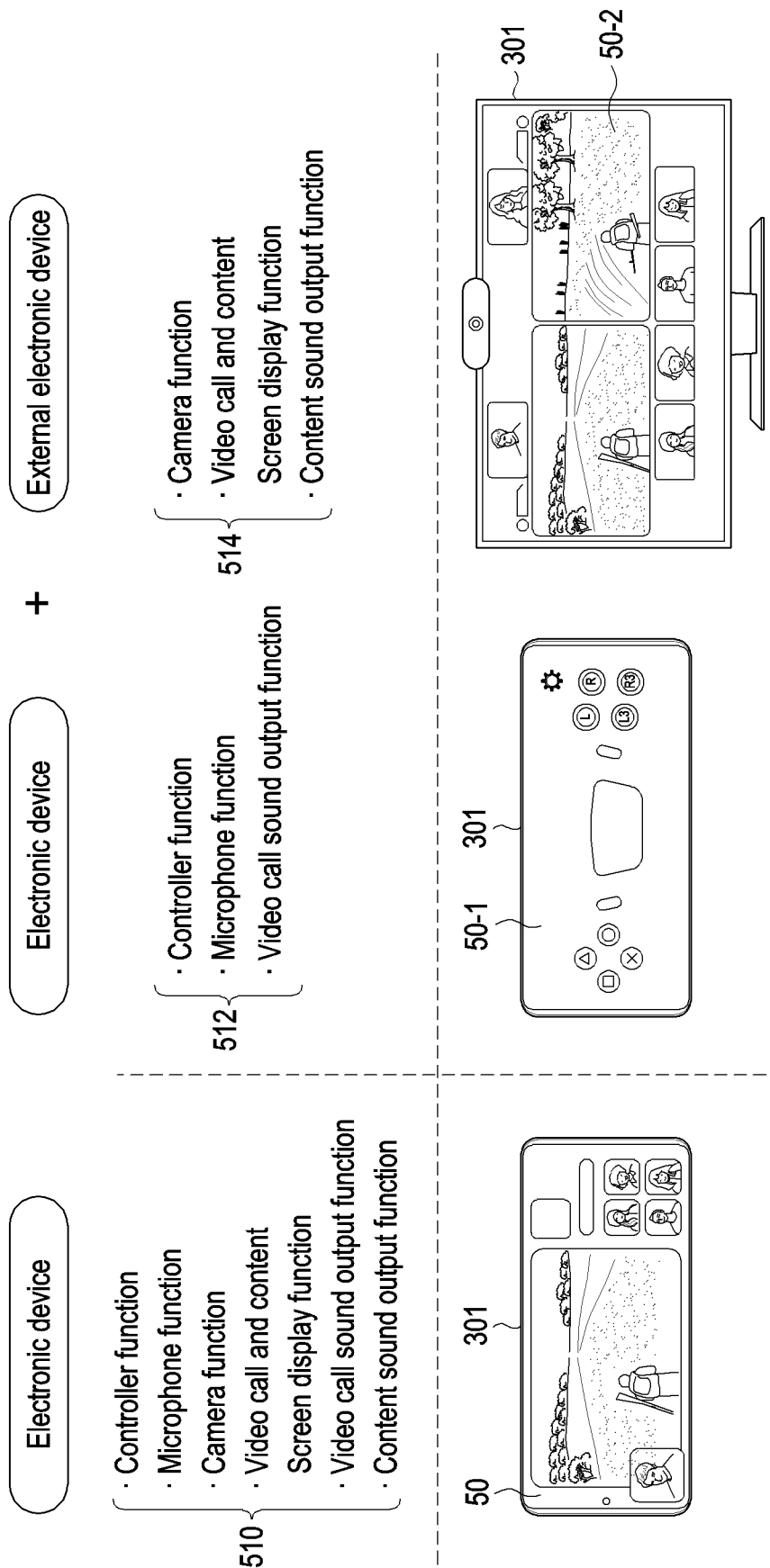
FIG. 5A is a diagram illustrating an example of distributing functions associated with video call and game content execution using an external electronic device when an example electronic device according to an embodiment executes a game content while performing a video call.

FIG. 5A is a diagram illustrating an example of distributing functions associated with video call and game content execution using an external electronic device when an example electronic device according to an embodiment executes game content while performing a video call.

Referring to FIG. 5A, when executing game content while performing a video call, the processor 320 of the electronic device 301 according to various embodiments may perform functions 510 associated with video call and game content execution. For example, the functions 510 associated with video call and game content execution may include a controller function, a microphone function, a camera function, a video call and content screen display function, a video call sound output function, a content sound output function, and/or other functions associated with video call and game content execution. The processor 320 according to an embodiment may distribute the functions 510 associated with video call and game content execution so that at least some functions 514 of the functions 510 associated with video call and game content execution are performed in the external electronic device 302 and the remaining functions 512 are performed in the electronic device 301. According to an embodiment, based on a hardware component more optimized for performing each of the functions 510 associated with video calling and content execution among the hardware components of the electronic device 301 and the hardware components of the external electronic device 302, and/or based on user selection, the processor 320 may identify the functions 512 to be executed in the electronic device 301 and the functions 514 to be executed in the external electronic device 302 among the functions associated with video calling and content execution. For example, the processor 320 may perform control so that the camera function, the video call and content screen display function, and the content sound output function among the functions 510 associated with video calling and content execution are performed by a camera (not illustrated), a display (not illustrated), and a speaker (not illustrated) of the external electronic device 302, as opposed to the camera module 380, the display 360, and the speaker 355 of the electronic device 301, and the controller function, the microphone function, and the video call sound output function are performed by the display 360, the microphone 350, and the speaker 355 of the electronic device 301. For example, in a case in which all the functions 510 associated with video call and game content execution are performed in the electronic device 301, the processor 320 of the electronic device 301 may display a video call and content screen 50 on the display 360. For example, in a case in which the controller function, the microphone function, and the video call sound output function among the functions 510 associated with video call and game content are performed in the electronic device 301, and the camera function, the video call and content screen display function, and the content sound output function are performed in the external electronic device 302, the processor 320 of the electronic device 301 may display a screen 50-1 (e.g., a game controller screen) corresponding to the controller function in the display 360 of the electronic device 301, and may display a video call and content screen 50-2 in the display of the external electronic device 302.

Figure 5B:
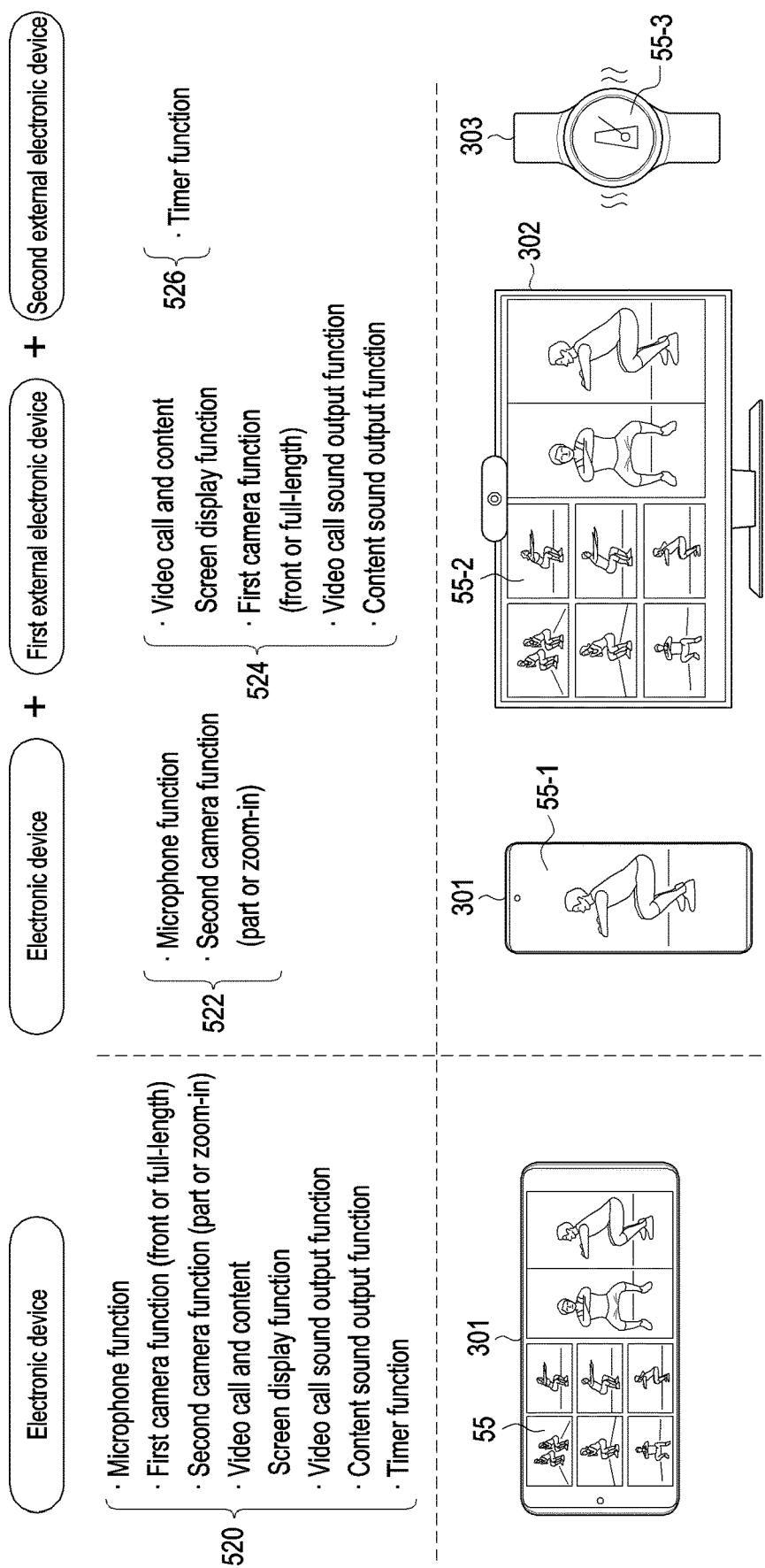
FIG. 5B is a diagram illustrating an example of distributing functions associated with video call and exercise content execution using an external electronic device when an example electronic device according to an embodiment executes an exercise content while performing a video call.

FIG. 5B is a diagram illustrating an example of distributing functions associated with video call and exercise content execution using an external electronic device when an example electronic device according to an embodiment executes exercise content while performing a video call.

Referring to FIG. 5B, when executing an exercise content while performing a video call, the processor 320 of the electronic device 301 according to various embodiments may perform functions 520 associated with video call and exercise content execution. For example, the functions 520 associated with video call and exercise content execution may include a microphone function, a first camera function (front or full-length), a second camera function (part or zoom-in), a video call and content screen display function, a video call sound output function, a content sound output function, a timer function and/or other functions associated with video call and exercise content execution. The processor 320 according to an embodiment may distribute the functions 520 associated with video call and exercise content execution so that at least some functions 524 of the functions 520 associated with video call and exercise content execution are performed in the first external electronic device 302, at least some other functions 526 are performed in the second external electronic device 303, and the remaining functions 522 are performed in the electronic device 301. According to an embodiment, based on a hardware component more optimized for performing each of the functions 520 associated with video call and exercise content execution among the hardware components of the electronic device 301, the hardware components of the first external electronic device 302, and the hardware components of the second external electronic device 303, and/or based on user selection, the processor 320 may identify the functions 522 to be performed in the electronic device 301, the functions 524 to be performed in the first external electronic device 302, and the functions 526 to be performed in the second electronic device 303 among the functions associated with video call and exercise content execution. For example, the processor 320 may perform control so that the microphone function, the second camera function (part or zoom-in) among the functions 520 associated with video call and exercise content execution are performed using the microphone 350 and the camera module 380 of the electronic device 301, the video call and content screen display function, the first camera function (front or full-length), the content sound output function, and the video call sound output function are performed by a display (not illustrated), a camera (not illustrated), and a speaker (not illustrated) of the first external electronic device 302, and the timer function is performed by a display (not illustrated) of the second external electronic device 303. For example, in a case in which all the functions 520 associated with video call and exercise content execution are performed in the electronic device 301, the processor 320 of the electronic device 301 may display a video call and exercise content screen 55 in the display 360. For example, in a case in which the processor 320 of the electronic device 301 performs control so that the microphone function and the second camera function (part or zoom-in) among the functions 520 associated with the video call and exercise content execution are executed in the electronic device 301, the video call and content screen display function, the first camera function (front or full-length), the content sound output function, and video call sound output function are performed in the first external electronic device 302, and the timer function is performed in the second external electronic device 303, the processor 320 of the electronic device 301 may display a screen 55-1 (part or zoom-in screen) based on the second camera function on the display 360 of the electronic device 301, may display a video call and exercise content screen 55-2 on the display of the first external electronic device 302, and may display a timer screen 55-3 on the display of the second external electronic device 303.

Figure 5C:
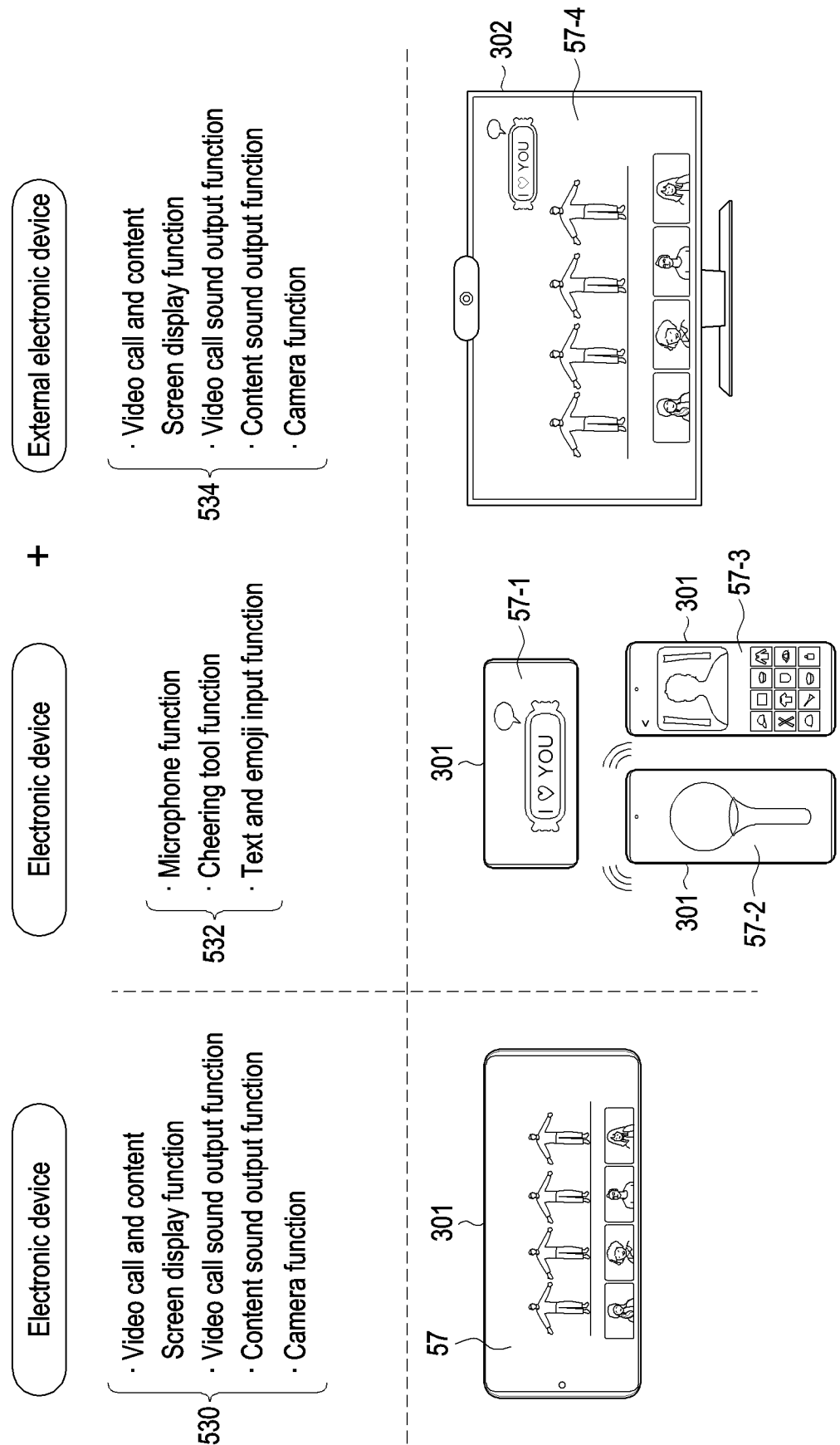
FIG. 5C is a diagram illustrating an example of distributing functions associated with video call and concert content execution using an external electronic device when an example electronic device according to an embodiment executes a concert content while performing a video call.

FIG. 5C is a diagram illustrating an example of distributing functions associated with video call and concert content execution using an external electronic device when an example electronic device according to an embodiment executes concert content while performing a video call.

Referring to FIG. 5C, when executing concert content while performing a video call, the processor 320 of the electronic device 301 according to an embodiment may perform functions 530 associated with video call and concert content execution. For example, the functions 530 associated with video call and concert content execution may include a video call and content screen display function, a video call sound output function, a content sound output function, a camera function and/or other functions associated with video call and concert content execution. The processor 320 according to an embodiment may distribute the functions 530 associated with video call and concert content execution so that at least some functions 534 of the functions 530 associated with video call and concert content execution are performed in the external electronic device 302 and the remaining functions 532 are performed in the electronic device 301.

According to an embodiment, based on a hardware component more optimized for performing each of the functions 530 associated with video calling and content execution among the hardware components of the electronic device 301 and the hardware components of the external electronic device 302, and/or based on user selection, the processor 320 may identify the functions 532 to be executed in the electronic device 301 and the functions 534 to be executed in the external electronic device 302 among the functions 530 associated with video call and concert content execution. For example, the processor 320 may perform control so that a microphone function, a cheering tool function, a text and emoji input function among the functions 530 associated with video call and concert content execution are performed using the microphone 350 and display 360 of the electronic device 301, and a video call and content screen display function, a video call sound output function, a content sound output function, and a camera function are performed using a display (not illustrated), a speaker (not illustrated), a camera (not illustrated) of the external electronic device 302. For example, in a case in which all the functions 530 associated with video call and concert content execution are performed in the electronic device 301, the processor 320 of the electronic device 301 may display a video call and concert content screen 57 on the display 360. For example, in a case in which the microphone function, the cheering tool function, and the text and emoji input function among the functions 530 associated with video calling and concert content execution are performed in the electronic device 301, and the video call and content screen display function, the video call sound output function, and the content sound output function, and the camera function are performed in the external electronic device 302, the processor 320 of the electronic device 301 may display a screen 57-1 or 57-2 associated with the cheering tool function and a text and emoji input function screen 57-3 on the display 360 of the electronic device 301, and may display a video call and concert content screen 57-4 on the display of the external electronic device 302.

Figure 6A:
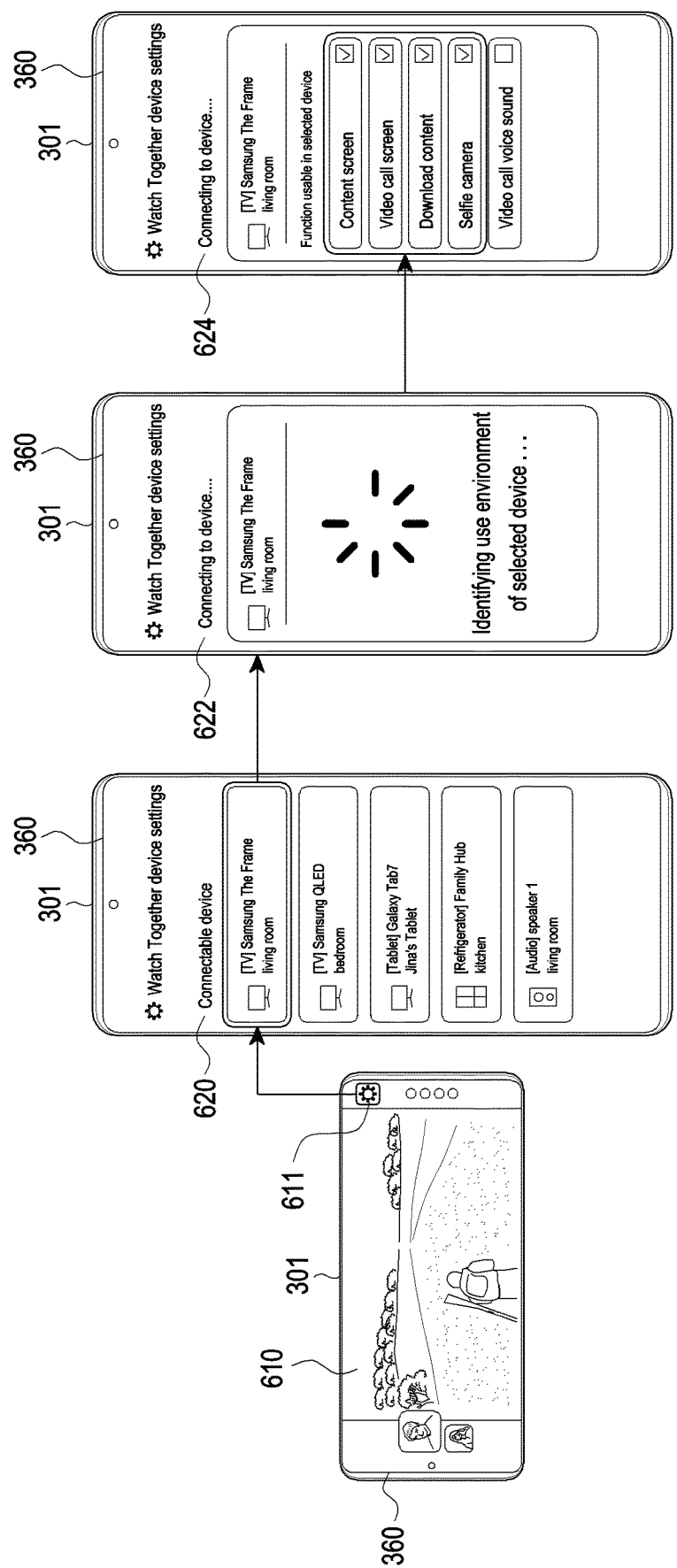
FIG. 6A is a diagram illustrating an example of a screen when an example electronic device according to an embodiment selects a function to be executed in an external electronic device among functions associated with video calling and content execution.
Figure 6B:
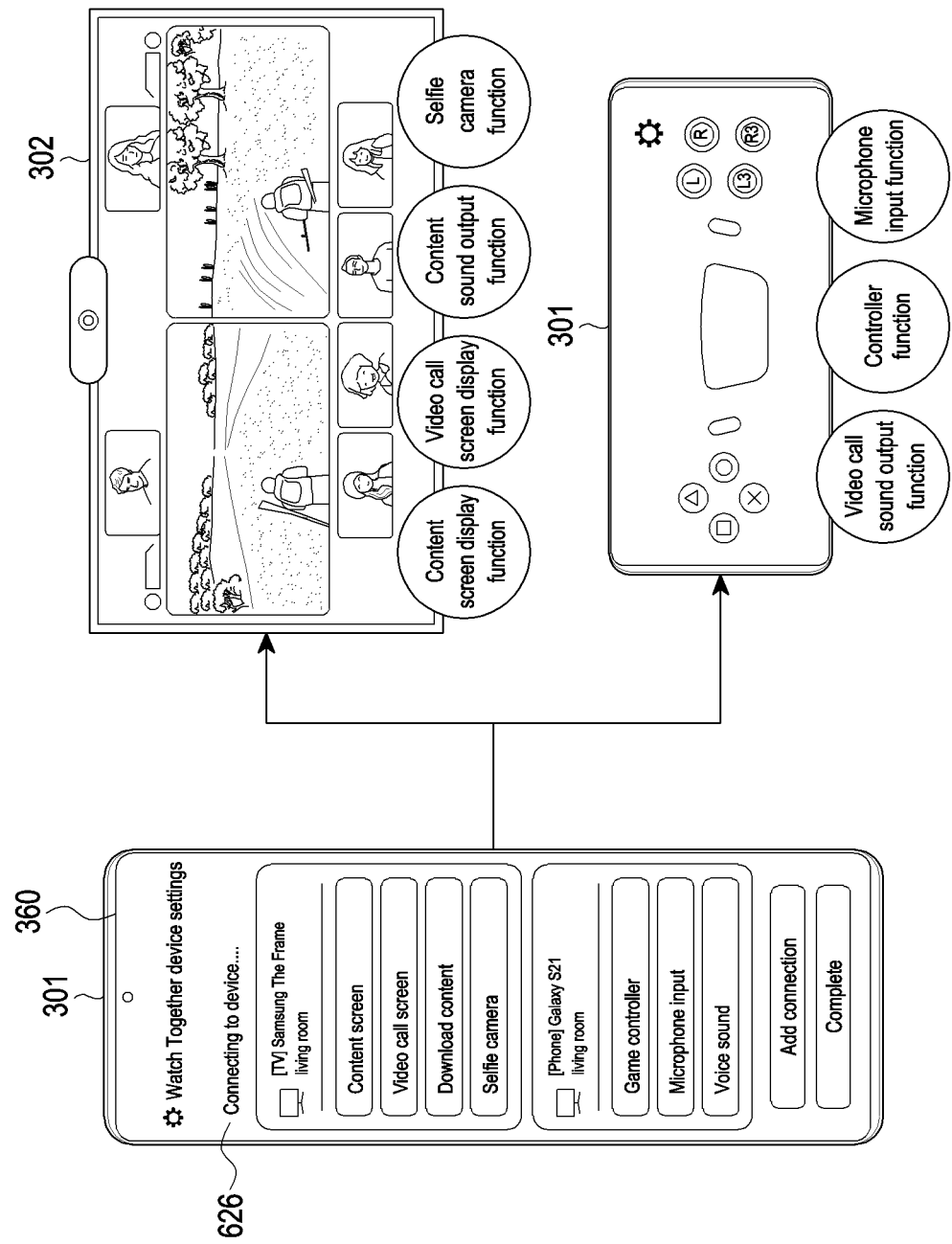
FIG. 6B is a diagram illustrating an example of performing a function by an electronic device and an external electronic device according to a result of selecting, by an example electronic device according to an embodiment, a function to be executed in the external electronic device among functions associated with video calling and content execution.

FIG. 6A is a diagram illustrating an example of a screen when an example electronic device according to an embodiment selects a function to be executed in an external electronic device among functions associated with video calling and content execution, and FIG. 6B is a diagram illustrating an example of performing a function by an example electronic device and an external electronic device according to a result of selecting, by an example electronic device according to an embodiment, a function to be executed in the external electronic device among functions associated with video calling and content execution.

Referring to FIG. 6A, while displaying a video call and content execution screen 610 in the display 360 based on video calling and content execution, the processor 360 of the electronic device 301 according to an embodiment may display an external electronic device information screen 620 identifying external electronic devices connectable to the electronic device 301, based on selecting an icon 611 (e.g., setting icon) associated with function distribution to the external electronic device 302. The processor 360 according to an embodiment may display the list of devices (or equipment) connected or connectable to the electronic device 301 in the external electronic device information screen 620 associated with an external electronic device connectable to the electronic device 301. The processor 360 according to an embodiment may obtain device configuration information (e.g., use environment) of each of the devices included in the list of devices (or equipment) connected or connectable to the electronic device 301, or may obtain device configuration information (use environment) associated with an external electronic device (e.g., [TV] Samsung The Frame) selected (by a user or automatically) from the list. The processor 360 according to an embodiment may display, in the display 360, an information screen 622 indicating that the device configuration information (use environment) associated with an external electronic device is being identified (or obtained). The processor 360 according to an embodiment may identify at least one function executable in an external electronic device based on identifying of the device configuration information (use environment) associated with an external electronic device. The processor 360 according to an embodiment may display, on a screen 624, at least one function (e.g., a content screen (display function), a video call (screen display function), a content download (function), a selfie camera (function), and/or a video call voice (output function)) executable in an external electronic device. The processor 360 according to an embodiment may select at least one function to be executed (e.g., a content screen (display function), a video call (screen display function), a content download (function), and/or a selfie camera (function)) in an external electronic device from the screen 624 showing at least one function executable in an external electronic device. For example, based on device configuration information (e.g., hardware component information) of the electronic device 101 and device configuration information (e.g., hardware component information) of the external electronic device 102 (and/or based on user selection), the processor 320 may select (or identify) at least one function to be executed in the external electronic device 102 among the functions associated with video calling and content execution.

Referring to FIG. 6B, based on the selection (or identification) of at least one function to be executed in the external electronic device 102 from among functions associated with video calling and content execution, the processor 360 of the electronic device 301 according to an embodiment may display a screen 626 showing a function to be executed in an external electronic device and a function to be executed in the electronic device 301. The processor 360 according to an embodiment may connect to the external electronic device 302 and may perform control so that a function to be executed in the external electronic device (e.g., a content screen display function, a video call screen display function, a content sound output function, and a selfie camera function) is performed in the external electronic device 302, and may perform control so that a function to be executed in the electronic device 301 (e.g., a video call sound output function, a controller function, a microphone input function) is performed in the electronic device 301.

Figure 7:
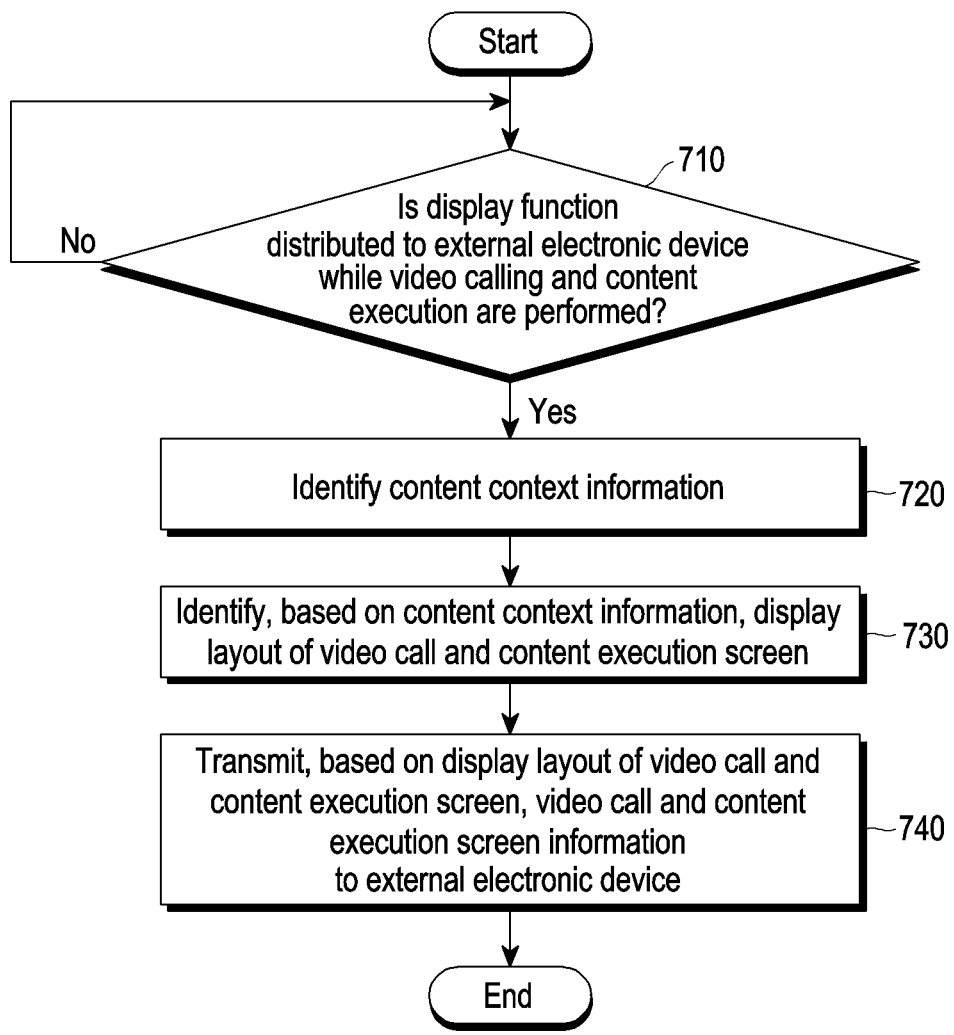
FIG. 7 is a flowchart illustrating example operation performed when a display function among functions associated with video calling and content execution is distributed to an example external electronic device according to an embodiment.

Referring to FIG. 7, a processor (e.g., the processor 120 of FIG. 1 or the processor 320 of FIG. 3) of an electronic device (e.g., the electronic device 101 of FIG. 1 or the electronic device 301 of FIG. 3) according to an embodiment may perform at least one operation among operations 710, 720, 730, and 740.

In operation 710, the processor 320 according to an embodiment may identify whether a display function is distributed to an external electronic device while video calling and content execution are performed. For example, the processor 320 may identify (or determine) whether a function to be executed in the external electronic device 302 is a video call and content execution screen display function.

In operation 720, based on the display function among functions associated with video calling and content execution being distributed to the external electronic device 302, the processor 320 according to an embodiment may identify content context information. For example, the context information of the content may include a content format, a content type, a content progress state, and/or content participant information. For example, the content format may include a tournament (or competition) format, a lecture (or class) format, a sharing (or friendship) format, and/or other formats. The content type may include a game (or sports), an exercise (or dance), a concert (or show), and/or other types. The content progress state may include a score (or mark) state, a victory-or-defeat state, progress/end state, and/or other states. The content participant information may include information associated with a user or an electronic device that is participating in a content.

In operation 730, the processor 320 according to an embodiment may identify, based on the content context information, a display layout of a video call and content execution screen. Based on the content context information, for example, a content format, a content type, a content progress state, and/or content participant information, the processor 320 according to an embodiment may identify (or designate) a display layout for a video call and content execution screen to be displayed in the external electronic device 102.

In operation 740, the processor 320 according to an embodiment may transmit information associated with the video call and content execution screen to the external electronic device 302, based on the display layout of the video call and content execution screen. The external electronic device 302 (or at least one processor of the external electronic device 302) according to an embodiment may display, on a display, the video call and content execution screen in a predetermined display layout provided from the electronic device 301.

Figure 8:
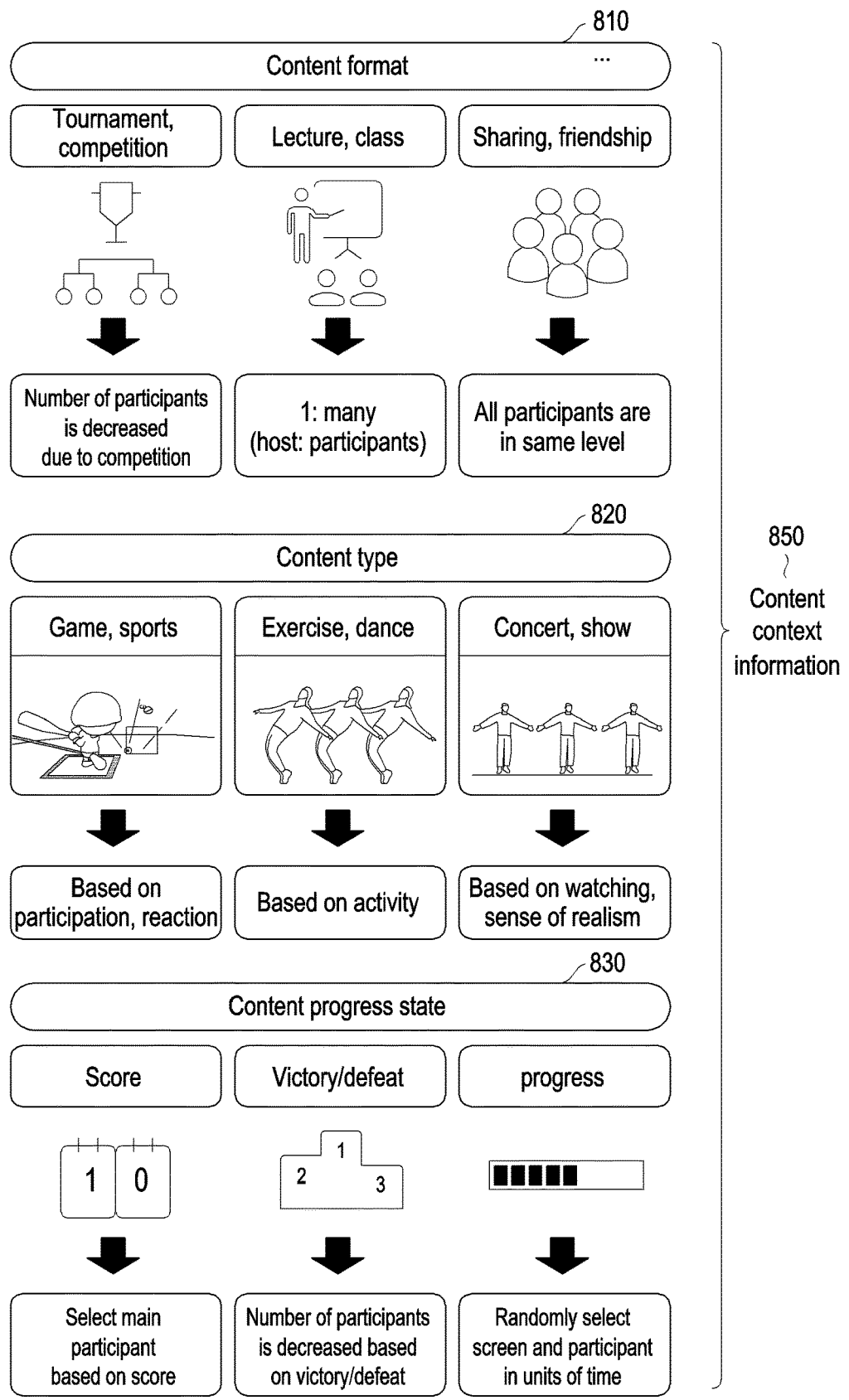
FIG. 8 is a diagram illustrating an example of content context information according to an embodiment.

FIG. 8 is a diagram illustrating an example of content context information according to an embodiment.

Referring to FIG. 8, the content context information according to an embodiment may include a content format 810, a content type 820, a content progress matter (or state) 830, and/or content participant information.

The content format 810 according to an embodiment may include a tournament (or competition) format, a lecture (or class) format, a sharing (or friendship) format, and/or other formats. For example, in a case in which the content format is a tournament (or competition) format, the number of participants joining content among video callers may be decreased due to competition occurring when the content is in progress, and the processor 320 may change the display layout according to a change in the number of participants joining the content. For example, in a case in which the content format is a lecture (or class) format, one (e.g., a host) of the video callers may be a participant of content and the remaining video callers may be viewers, and the processor 320 may identify (or determine) a display layout corresponding thereto. For example, in a case in which the content format is a sharing (or friendship) format, all of the video callers are in a same level, and the processor 320 may identify (or determine) a display layout corresponding thereto.

The content type 820 according to an embodiment may include a game (or sports) type, an exercise (or dance) type, a concert (or show) type, and/or other types. For example, in a case in which the content type is a game (or sports) type, a video caller has a high possibility of participating in or responding to the content, and the processor 320 may change a display layout based on whether a video caller joins the content or whether a response to the content is received. For example, in a case in which the content type is an exercise (or dance) type, a video caller has a high possibility of moving while watching an exercise or dance, and the processor 320 may change a display layout based on whether the movement of the video caller is detected (or received). For example, in a case in which the content type is a concert (or a show) type and a video caller may desire to have a sense of realism while watching the concert or show, and the processor 320 may change a display layout to a display layout for increasing a sense of realism for the video caller.

The content progress matter (progress state) 830 according to an embodiment may include a score, victory/defeat, a progress, and/or other progress matters. For example, in a case in which the content progress state is a predetermined score (mark), the processor 320 may change a display layout based on a main content participant determined based on a score among participants of the content. For example, in a case in which the content progress matter is victory/defeat, the processor 320 may change a display layout according to a change in the number of participants based on the victory/defeat of each of the video callers. For example, in a case in which the content progress matter is progress, the processor 320 may randomly display a content screen in units of time, or may change a display layout based on a participant randomly selected.

Figure 9:
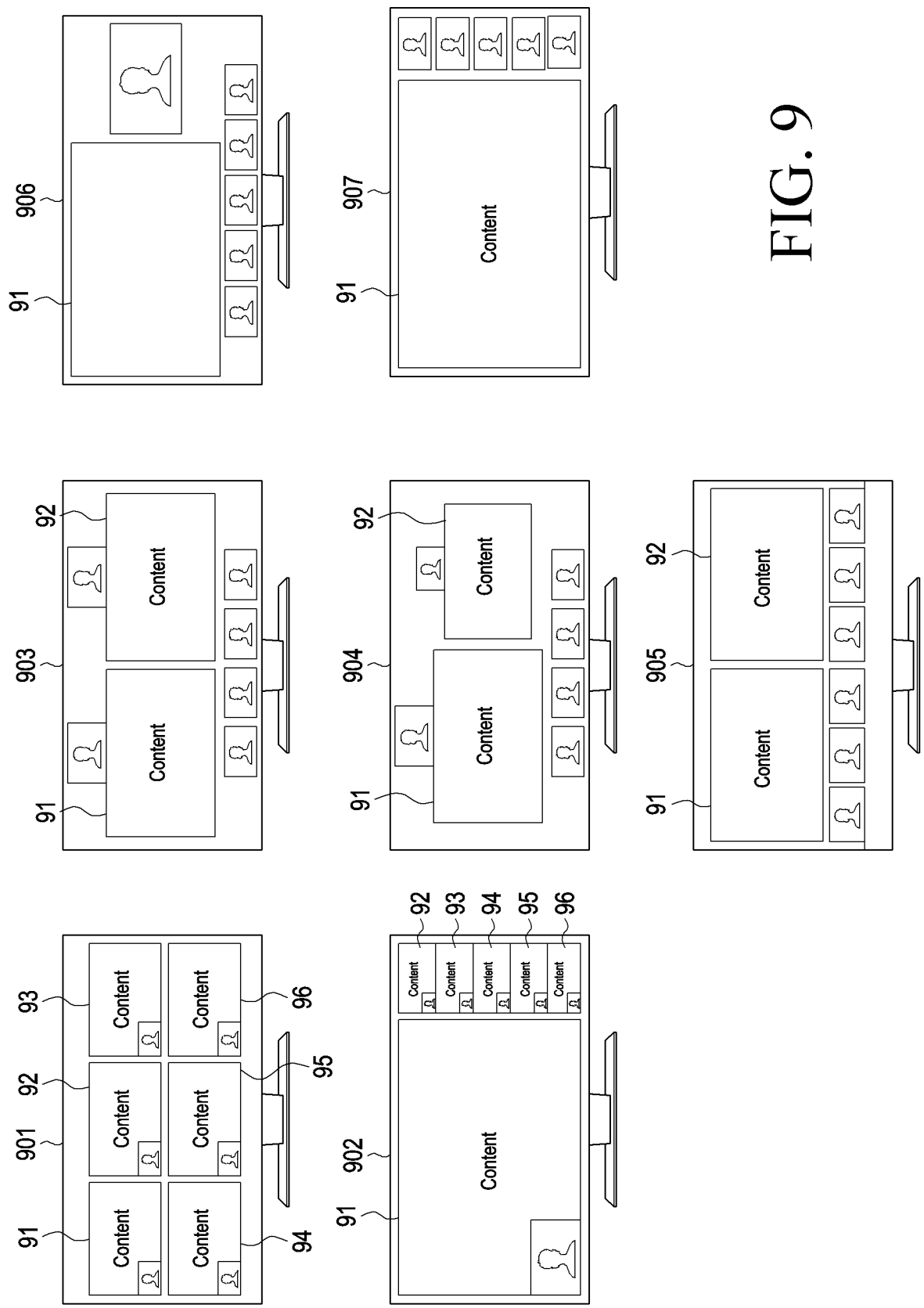
FIG. 9 is a diagram illustrating examples of a display layout according to an embodiment.

FIG. 9 is a diagram illustrating examples of a display layout according to an embodiment.

Referring to FIG. 9, the processor 320 of the electronic device 301 according to an embodiment may identify, based on content context information, one of a plurality of display layouts (e.g., layouts 901 to 907) as a display layout of a video call and content execution screen, and may perform control so that the video call and content execution screen is displayed on a display of the external electronic device 302 (or the display 360 of the electronic device 301) based on the identified display layout.

The processor 320 according to an embodiment may display a video call content execution screen based on first and second display layouts 901 and 902 when all video callers receive a content execution screen provided (or shared), may display a video call and content execution screen based on third to fifth display layouts 903 to 905 when only some of the video callers receive a content execution screen provided (or shared), and may display a video call and content execution screen based on sixth and seventh display layouts 906 and 907 when only one of the video callers receives a content execution screen provided (or shared).

According to an embodiment, in a case in which video callers 91 to 96 participate in or watch a content in the same level, the processor 320 may display a video call and content execution screen based on the first display layout 901. In a case in which the participant 91 having the highest score among the video callers 91 to 96 is present, or a main participant is randomly selected, the processor 320 according to an embodiment may display a video call and content execution screen based on the second display layout 902. In a case in which some video callers 91 and 92 among the video callers are joining a content in a tournament manner, or the video callers are classified as the participants 91 and 92 of the content and spectators, the processor 320 according to an embodiment may display a video call and content execution screen in the third display layout 903. In a case in which some video callers 91 and 92 among the video callers are participating in content and the video callers joining the content have scores, the processor 320 according to an embodiment may display a video call and content execution screen based on the fourth display layout 904 that increases the size of a display area for the participant 91 having a high(er) score. In a case in which all of the video callers are participating in content and some participants are in a first team 91 and the remaining participants are in a second team 92, the processor 320 according to an embodiment may display a video call and content execution screen based on the fifth display layout 905. In a case in which a video caller 91 who is the final winner of a content is present among the video callers, the processor 320 according to an embodiment may display a video call and content execution screen based on the sixth display layout 906. In a case in which video callers simultaneously access (or simultaneously watch) a single content, the processor 320 may display a video call and content execution screen based on the seventh display layout 907.

Figure 10:
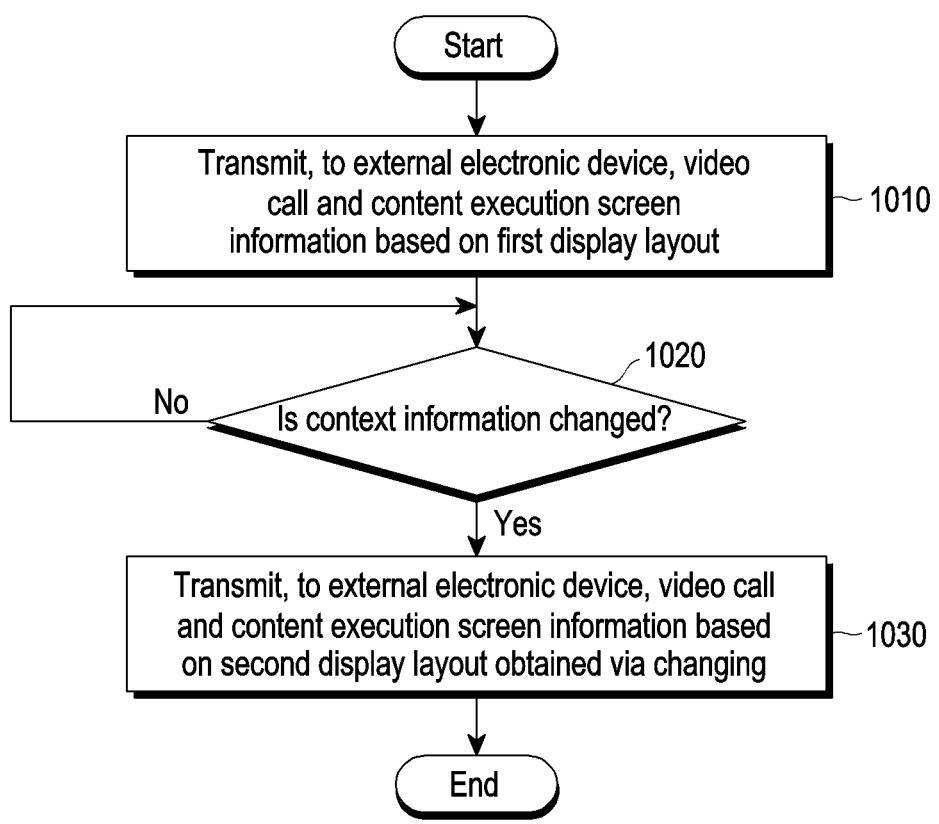
FIG. 10 is a flowchart illustrating an example operation of changing a display layout according to a change in content context information while an example electronic device according to an embodiment displays a video call and content execution screen.

FIG. 10 is a flowchart illustrating an example operation of changing a display layout according to a change in content context information while an example electronic device according to an embodiment displays a video call and content execution screen.

Referring to FIG. 10, a processor (e.g., the processor 120 of FIG. 1 or the processor 320 of FIG. 3) of an electronic device (e.g., the electronic device 101 of FIG. 1 or the electronic device 301 of FIG. 3) according to an embodiment may perform at least one operation among operations 1010 to 1030.

In operation 1010, the processor 320 according to an embodiment may transmit, to the external electronic device 302, first video call and content execution screen information provided in a first display layout identified based on content context information.

In operation 1020, the processor 320 according to an embodiment may identify whether the content context information is changed while transmitting the first video call and content execution screen information. For example, the processor 320 may identify a change in a content format, a content type, a content progress state, and/or content participant information.

In operation 1030, based on the change in the content context information, the processor 320 according to an embodiment may transmit, to the external electronic device 102, second video call and content execution screen information provided in a second display layout. Accordingly, the external electronic device 102 may display a video call and content execution screen of which the layout is changed according to the change in the content context information.

According to an embodiment, a method of performing, by an electronic device, a video call and content function using an external electronic device, may include an operation of identifying, based on video calling and content execution, an external electronic device connectable to the electronic device, an operation of identifying at least one function executable in the external electronic device among functions associated with video calling and content execution, an operation of identifying, based on device configuration information of the electronic device and device configuration information of the external electronic device, a function to be executed in the external electronic device among the at least one function executable in the external electronic device, and an operation of transmitting, to the external electronic device, information corresponding to the function to be executed in the external electronic device (e.g., via a communication module).

According to an embodiment, the functions associated with video calling and content execution may include functions associated with a video call and functions associated with execution of content.

According to an embodiment, the functions associated with a video call may include a video call screen display function, a selfie-camera function, a video call voice output function, and/or a microphone input function.

According to an embodiment, the functions associated with execution of content may include a content screen display function, a content sound output function, a content-related input function, a content-related camera function, and/or a content-related sensing function.

According to an embodiment, the device configuration information of the electronic device may include information associated with hardware components included in the electronic device, and the device configuration information of the external electronic device may include information associated with hardware components included in the external electronic device.

According to an embodiment, an operation of identifying context information of a content in a case in which the function to be executed in the external electronic device is a function of displaying a video call and content execution screen, an operation of identifying a display layout of the video call and content execution screen based on the context information of the content, and an operation of transmitting, based on the identified display layout, information associated with the video call and content execution screen to the external electronic device may be included.

According to an embodiment, the context information of the content may include at least one of a content format, a content type, or a content progress state.

According to an embodiment, an operation of identifying a change in the context information of the content while a first video call and content execution screen is displayed in a first display layout, an operation of identifying a second display layout based on the change in the context information of the content, and an operation of displaying the first video call and content execution screen in the second display layout may be included.

According to an embodiment, the external electronic device may include a TV.

Figure 11A:
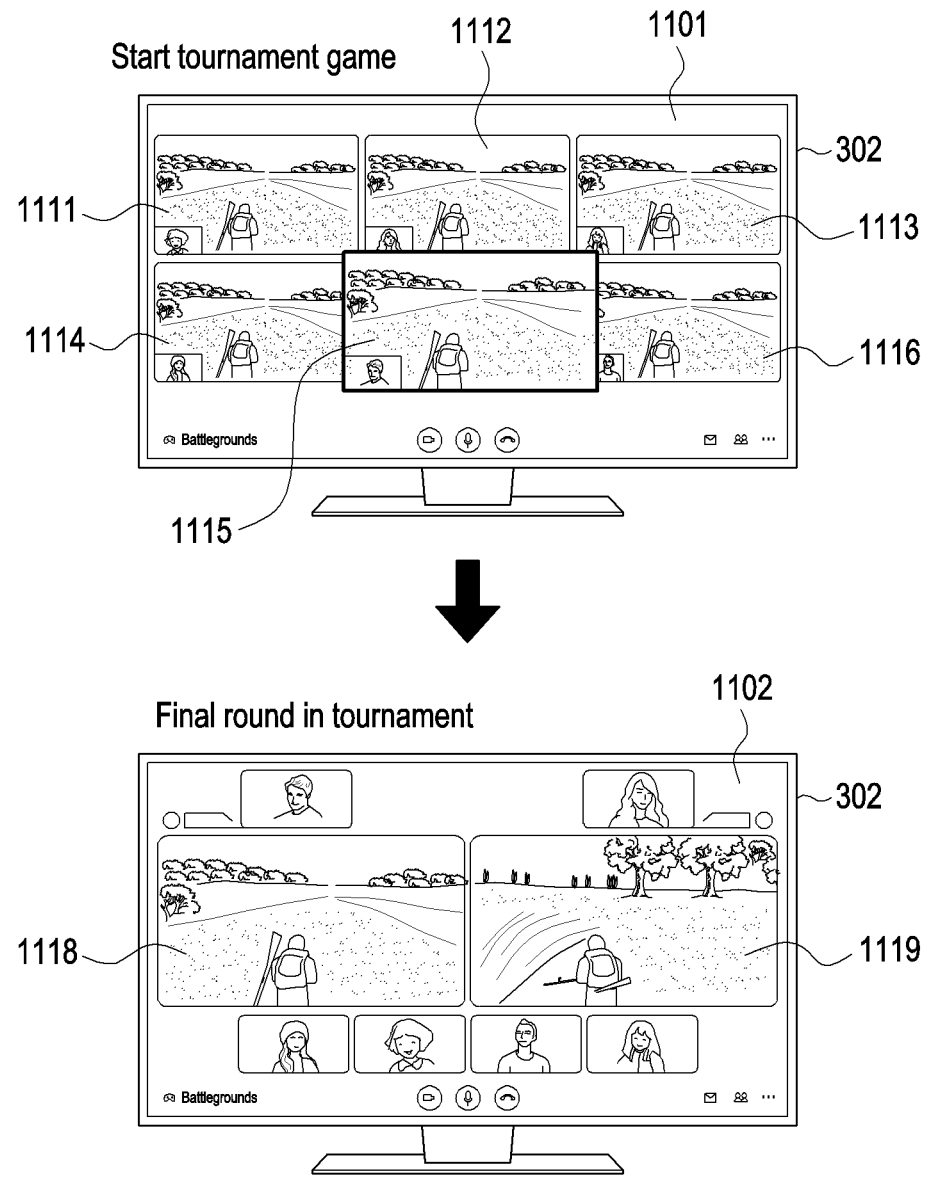
FIG. 11A is a diagram illustrating an example of a case in which content context information is changed from the start of a tournament game to competition in a tournament, and to a final round, while a first video call and content execution screen is displayed in a first display layout according to an embodiment.

FIG. 11A is a diagram illustrating an example of the case in which content context information is changed from the start of a tournament game to competition in a tournament, and to a final round, while a first video call and content execution screen is displayed in a first display layout according to an embodiment.

Referring to FIG. 11A, in a case in which, when a tournament game content is executed while a video call is performed, a tournament game begins and all 6 video callers participate in the tournament game, the processor 320 of the electronic device 301 according to an embodiment may transmit, to the external electronic device 302 information associated with a first video call and content execution screen 1101 based on a first display layout that shows images 1111, 1112, 1113, 1114, 1115, and 1116 of the respective video callers who are participating in the tournament game content. The external electronic device 302 may display a first video call and content execution screen 1101 on a display. In a case in which content context information is changed to the final round in the tournament game as the tournament game content is in progress after the tournament game begins, the processor 320 according to an embodiment may change the first display layout to a second display layout to show content images 1118 and 1119 of participants who are participating in the final round, and may transmit, to the external electronic device 302, information associated with a second video call and content execution screen 1102 based on the second display layout. The external electronic device 302 may display the second video call and content execution screen 1102 on the display.

Figure 11B:
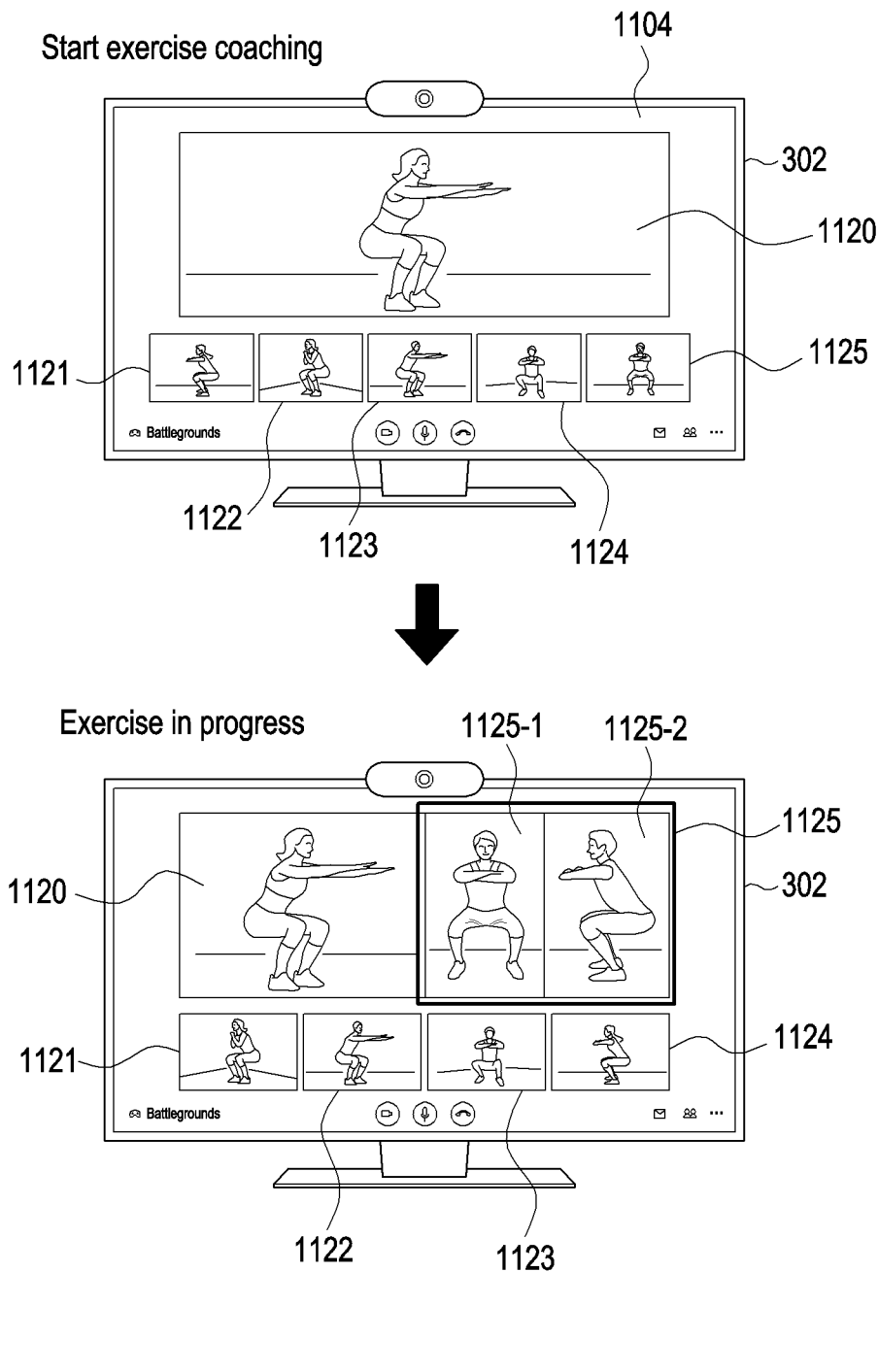
FIG. 11B is a diagram illustrating an example of a case in which content context information is changed from the start of exercise coaching to an exercise in progress, while a first video call and content execution screen is displayed in a first display layout according to an embodiment.

FIG. 11B is a diagram illustrating an example of a case in which content context information is changed from the start of exercise coaching to an exercise in progress, while a first video call and content execution screen is displayed in a first display layout according to an embodiment.

Referring to FIG. 11B, in a case in which five (5) video callers 1121, 1122, 1123, 1124, and 1125 watch a single exercise content 1120 when an exercise content is executed while a video call is performed, the processor 320 of the electronic device 301 according to an embodiment may transmit, to the external electronic device 302, information associated with a first video call and content execution screen 1104 based on a first display layout corresponding to the case. The external electronic device 302 may display the first video call and content execution screen 1104 on a display.

In a case in which, while the exercise is in progress, content context information is changed to a situation in which a user 1125 of the electronic device 301 participates in the exercise, the processor 320 according to an embodiment may change the first display layout to a second display layout that shows the exercise participate images 1125-1 and 1125-2 of the user 1125 who is participating in the exercise, and may transmit, to the external electronic device 302, information associated with a second video call and content execution screen 1105 based on the second display layout. The external electronic device 302 may display the second video call and content execution screen 1105 on the display. According to an embodiment, the exercise participate image of the user 1125 who is participating in the exercise may include a first exercise participate image 1125-1 and a second exercise participate image 1125-2, and the first exercise participate image 1125-1 may be an image (a front image) shot using a first camera function of the external electronic device 302, and the second exercise participate image 1125-2 may be an image shot using a second camera function of the electronic device 301.

Figure 12:
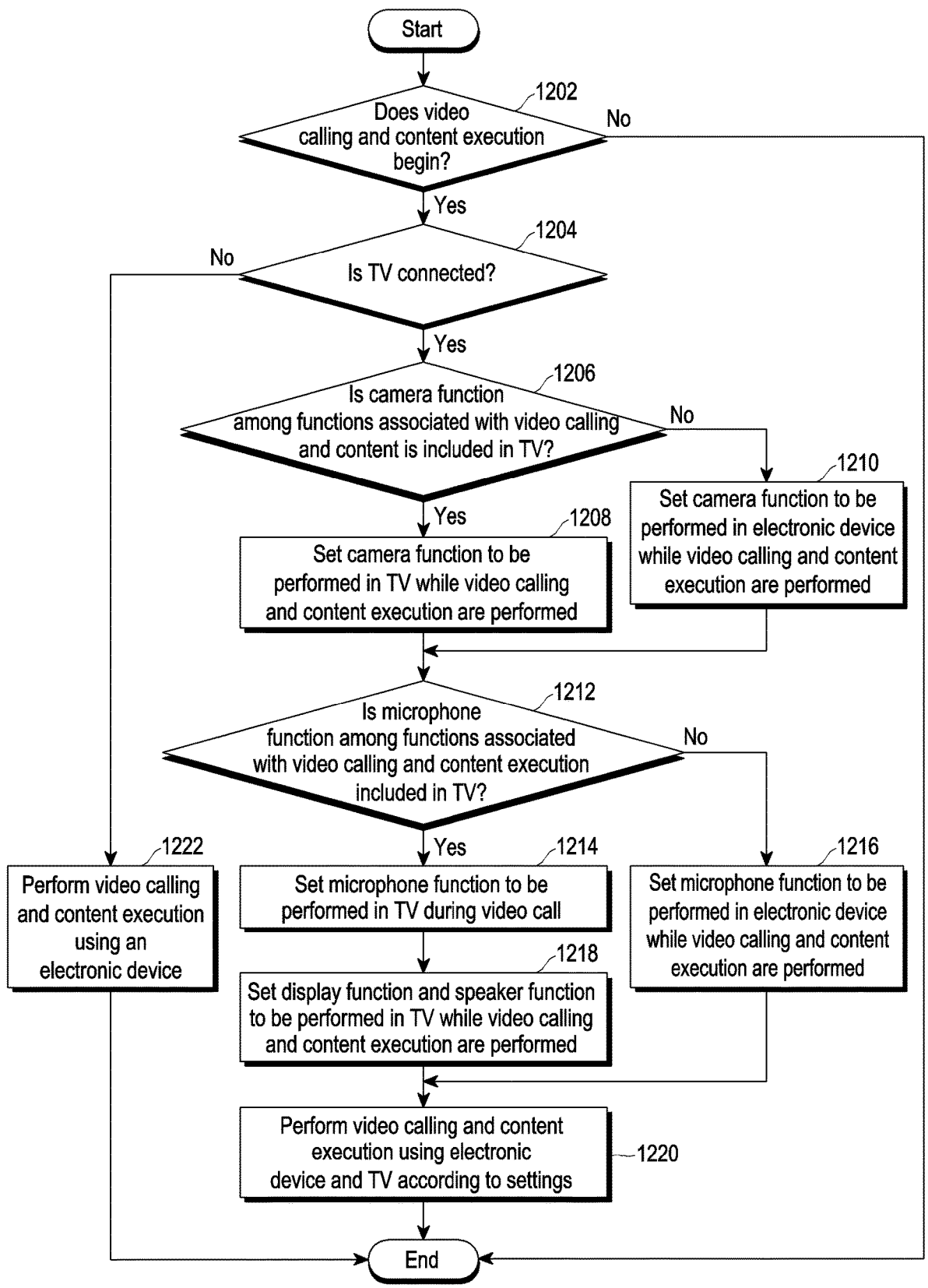
FIG. 12 is a diagram illustrating an example operation of distributing some of functions associated with video calling and content execution to a TV and performing the same when video calling and content execution are performed in an example electronic device according to an embodiment.

FIG. 12 is a diagram illustrating an operation of distributing some of functions associated with video calling and content execution to a TV, and performing the same when video calling and content execution are performed in an example electronic device according to an embodiment.

Referring to FIG. 12, a processor (e.g., the processor 120 of FIG. 1 or the processor 320 of FIG. 3) of an electronic device (e.g., the electronic device 101 of FIG. 1 or the electronic device 301 of FIG. 3) according to an embodiment may perform at least one operation among operations 1202 to 1220.

In operation 1202, the processor 320 according to an embodiment may identify whether video calling and content execution are started.

In operation 1204, based on the start of video calling and content execution, the processor 320 according to an embodiment may identify whether the electronic device is in a state of being connected to a TV. In a case in which the electronic device is not in the state of being connected to a TV when video calling and content execution are started, the processor 320 according to an embodiment may perform functions associated with video calling and content using the electronic device 301 in operation 1222. For example, the functions associated with video calling and content may include functions associated with a video call and functions associated with content execution. For example, the functions associated with a video call may include, but are not limited to, a video call screen display function, a selfie camera function, a video call voice output function, a microphone input function and/or other functions associated with a video call, and the functions associated with content execution may include, but are not limited to, a content screen display function, a content sound output function, a content-related input function, a content-related camera function, a content-related sensing function, and/or other functions associated with a content.

In operation 1206, in a case in which the electronic device is in the state of being connected to a TV when video calling and content execution are started, the processor 320 according to an embodiment may identify (or determine) whether a camera function (e.g., a selfie camera function and/or a content-related camera function) among functions associated with video calling and content is included in the TV.

In operation 1208, in a case in which the camera function among the functions associated with video calling and content execution is included in the TV, the processor 320 according to an embodiment may set (or select or designate) the camera function to be performed in the TV when video calling and content execution are performed.

In operation 1210, in a case in which the camera function among the functions associated with video calling and content execution is not included in the TV, the processor 320 according to an embodiment may set (or select or designate) the camera function to be performed in the electronic device 301 when video calling and content execution are performed.

In operation 1212, the processor 320 according to an embodiment may identify (or determine) whether a microphone function (e.g., a microphone input function) among functions associated with video calling and a content is included in the TV.

In operation 1214, in a case in which the microphone function among the functions associated with video calling and content execution is included in the TV, the processor 320 according to an embodiment may set (or select or designate) the microphone function to be performed in the TV when video calling and content execution are performed.

In operation 1216, in a case in which the microphone function among the functions associated with video calling and content execution is not included in the TV, the processor 320 according to an embodiment may set (or select or designate) the microphone function to be performed in the electronic device 301 when video calling and content execution are performed.

In operation 1218, the processor 320 according to an embodiment may set (or select or designate) a display function (e.g., a video call screen display function and/or content screen display function) and a speaker function (e.g., a video call sound output function and/or content sound output function) to be performed in the TV when video calling and content execution are performed.

In operation 1220, the processor 320 according to an embodiment may perform video calling and content execution using the electronic device 301 and/or the TV depending on settings.

Figure 13:
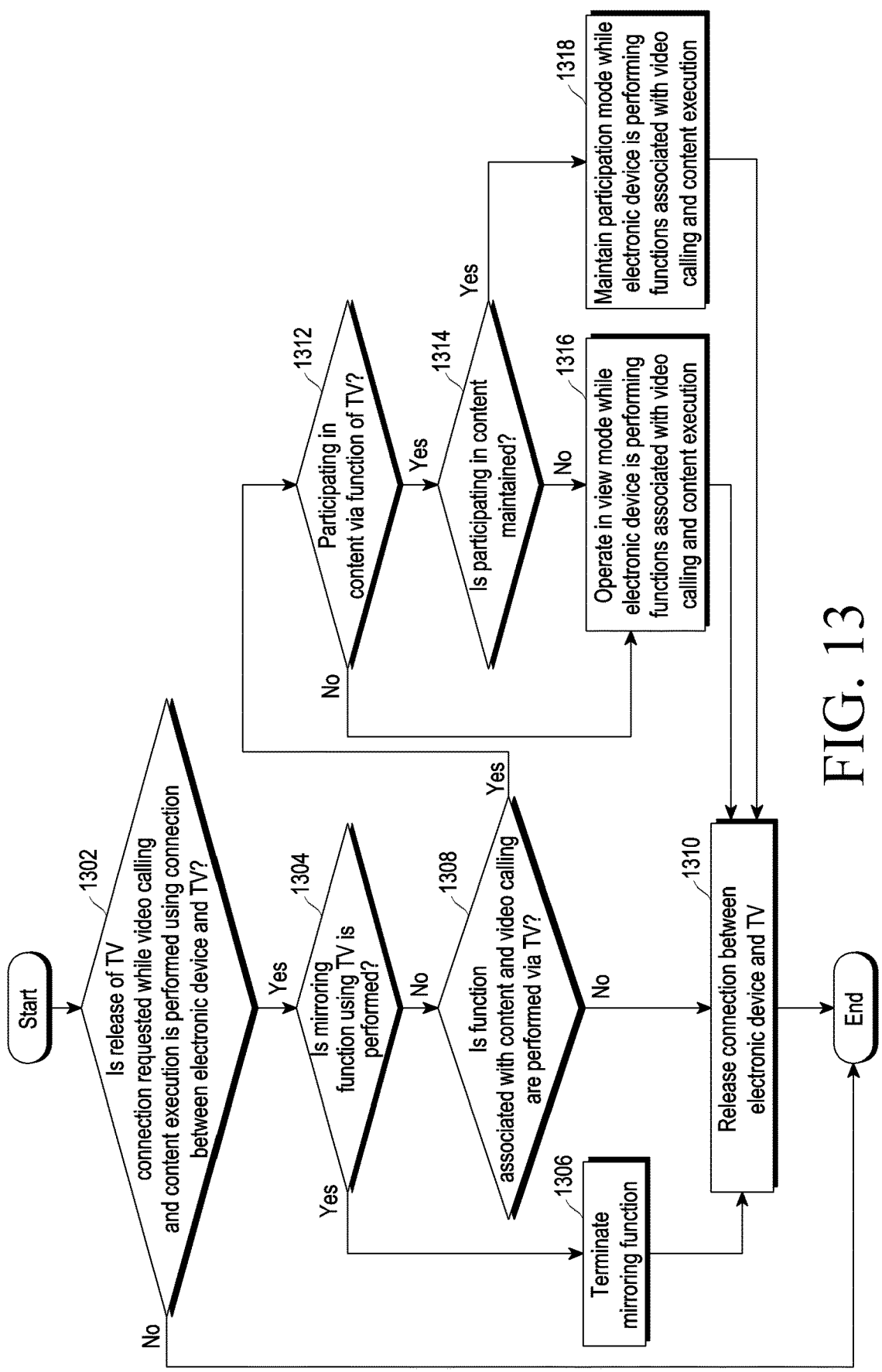
FIG. 13 is a diagram illustrating an example operation performed in response to a request for releasing the connection to a TV while video calling and content execution are performed using a TV and an example electronic device according to an embodiment.

FIG. 13 is a diagram illustrating an example operation performed in response to a request for releasing the connection to a TV while video calling and content execution are performed using a TV and an example electronic device according to an embodiment.

Referring to FIG. 13, a processor (e.g., the processor 120 of FIG. 1 or the processor 320 of FIG. 3) of an electronic device (e.g., the electronic device 101 of FIG. 1 or the electronic device 301 of FIG. 3) according to an embodiment may perform at least one operation among operations 1302, 1304, 1306, 1308, 1310, 1312, 1314, 1316, and 1318.

In operation 1302, the processor 320 according to an embodiment may identify (or determine) whether releasing a connection to a TV is requested while video calling and content execution are performed using the electronic device and the TV.

In operation 1304, the processor 320 according to an embodiment may identify (or determine) whether a mirroring function using the TV is being performed in a case in which releasing of the connection to the TV is requested while video calling and content execution are performed using the electronic device and the TV. For example, the mirroring function may be a function of simply mirroring the display information of the electronic device 301 and displaying the same on the TV.

In operation 1306, the processor 320 according to an embodiment may terminate the mirroring function when the mirroring function is being performed, and may proceed with operation 1310 so as to release the connection between the electronic device 301 and the TV.

In operation 1308, the processor 320 according to an embodiment may identify (or determine) whether a function associated with a content and video calling are being performed via the TV when the mirroring function using the TV is not performed. For example, functions associated with video call and content execution may include functions associated with a video call and functions associated with content execution. For example, the functions associated with a video call may include, but are not limited to, a video call screen display function, a selfie camera function, a video call voice output function, a microphone input function and/or other functions associated with a video call, and the functions associated with content execution may include, but are not limited to, a content screen display function, a content sound output function, a content-related input function, a content-related camera function, a content-related sensing function, and/or other functions associated with a content. For example, the processor 320 may identify whether at least some of the functions associated with video call and a content are being performed via the TV.

In operation 1310, the processor 320 according to an embodiment may release the connection between the electronic device 301 and the TV when a function associated with a content and a video calling is not being performed via the TV.

In operation 1312, in a case in which the function associated with the video call and the content is being performed via the TV, the processor 320 according to an embodiment may identify (or determine) whether the electronic device 301 (or a user of the electronic device 301) is participating in the content via a function of the TV.

In operation 1314, in a case in which the electronic device 301 (or the user of the electronic device 301) is participating in the content using a function of the TV, the processor 320 according to an embodiment may identify (or determine) whether participating in the content is to be maintained. For example, based on a user input associated with maintaining of participating in the content, whether the electronic device 301 (or the user of the electronic device 301) maintains participating in the content may be identified.

In operation 1316, when it is identified that participating in the content is not to be maintained, the processor 320 according to an embodiment may perform control so that the electronic device 301 performs the functions associated with video calling and content execution and operates in a view mode.

In operation 1318, when it is identified that participating in the content is to be maintained, the processor 320 according to an embodiment may perform control so that the electronic device 301 performs the functions associated with video calling and content execution and maintains a participate mode.

Figure 14A:
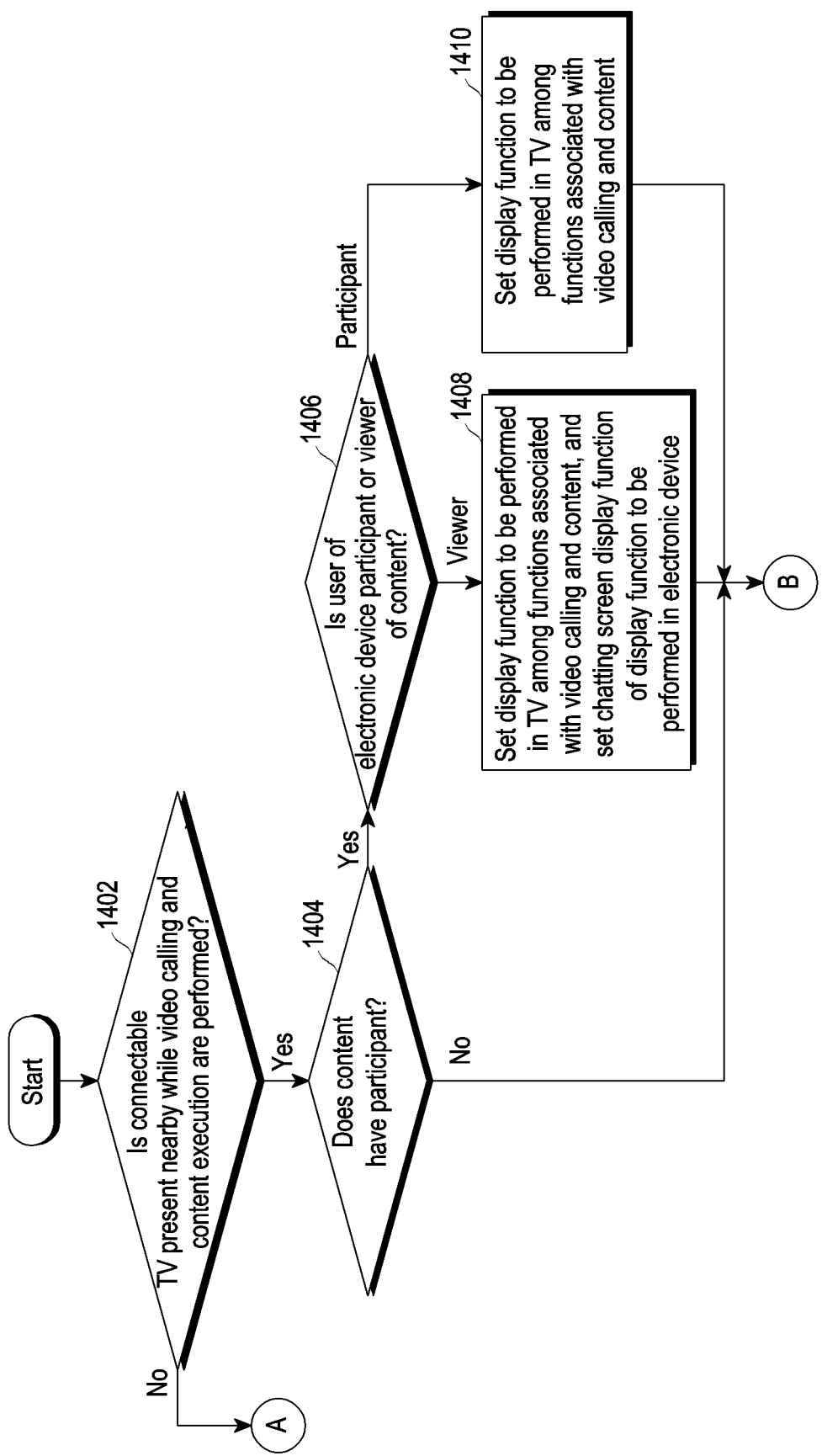
FIGS. 14A and 14B are diagrams illustrating example operations performed when a TV that is connectable is present nearby while video calling and content execution are performed in an example electronic device according to an embodiment.
Figure 14B:
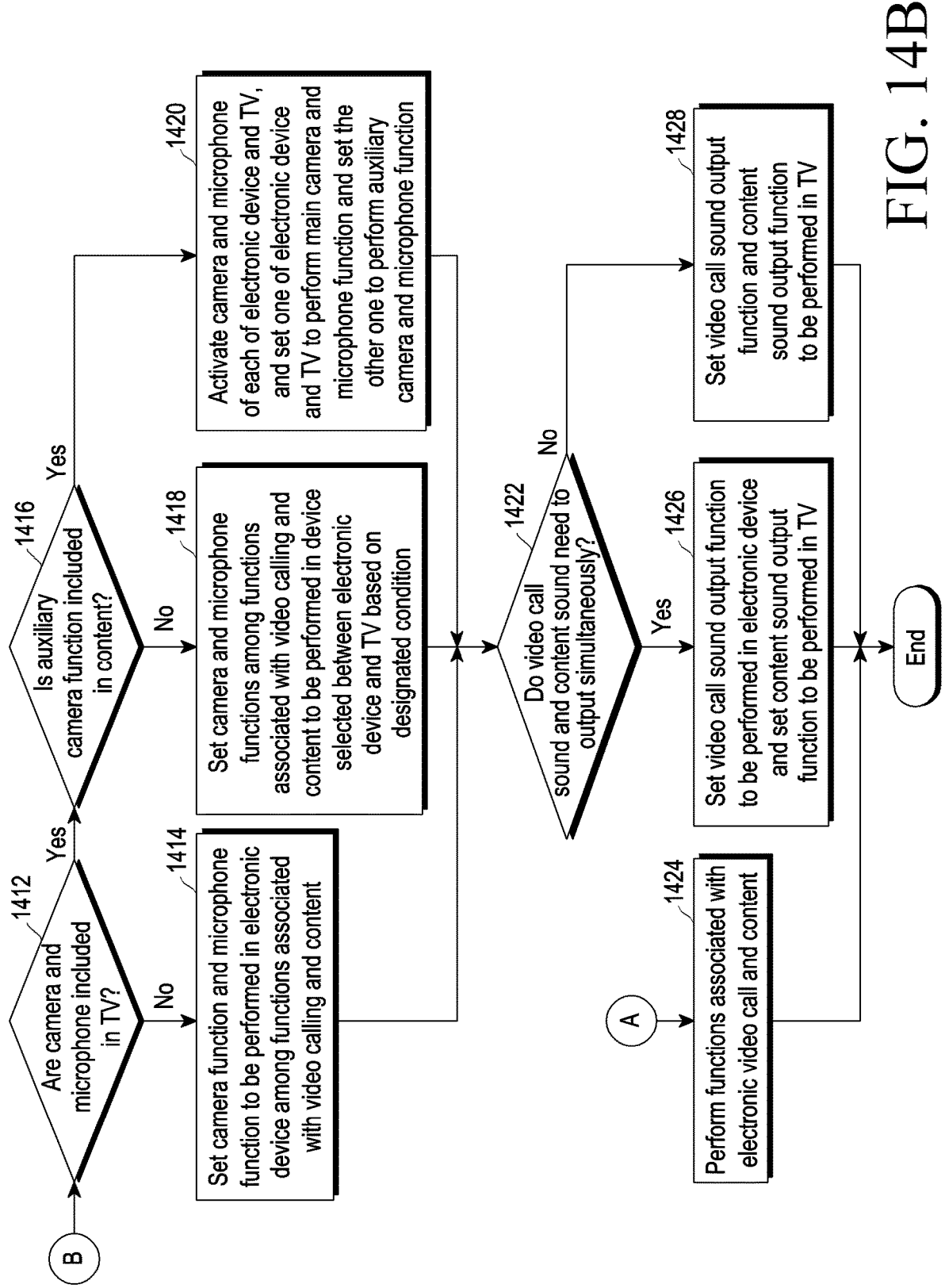

FIGS. 14A and 14B are diagrams illustrating an example operation performed when a TV that is connectable is present nearby while video calling and content execution are performed in an example electronic device according to an embodiment.

Referring to FIGS. 14A and 14B, a processor (e.g., the processor 120 of FIG. 1 or the electronic device 320 of FIG. 3) of an electronic device (e.g., the electronic device 101 of FIG. 1 or the electronic device 301 of FIG. 3) according to an embodiment may perform at least one operation among operations shown in FIGS. 14A and 14B.

In operation 1402, the processor 320 according to an embodiment may identify (or determine) whether a TV that is connectable is present nearby while video calling and content execution are performed. In a case in which the connectable TV is not present nearby while video calling and content execution are performed, the processor 320 according to an embodiment may perform functions associated with video call and content execution in the electronic device 301 in operation 1424.

In operation 1404, based on identifying identify that a TV that is connectable is present nearby while video calling and content execution are performed, the processor 320 according to an embodiment may identify whether the content that has a participant. For example, the processor 320 may identify whether a video caller that is participating in the content is present among video callers.

In operation 1406, based on identifying that the content has a participant in operation 1404, the processor 320 according to an embodiment may identify whether the electronic device 301 (or the user of the electronic device 301) is a participant of the content or a viewer.

In operation 1408, in a case in which the electronic device 301 (or the user of the electronic device 301) is a viewer of the content, the processor 320 according to an embodiment may set (or distribute) a display function among the functions associated with video call and content execution to be performed in the TV, and may set (or distribute) a chatting screen display function of the display function to be performed in the electronic device 301.

In operation 1410, in a case in which the electronic device 301 (or the user of the electronic device 301) is a participant of the content, the processor 320 according to an embodiment may set (or distribute) the display function among the functions associated with video call and content execution to be performed in the TV.

In operation 1412, the processor 320 according to an embodiment may identify whether a camera and a microphone are included in the TV.

In operation 1414, in a case in which a camera and a microphone are not included in the TV, the processor 320 according to an embodiment may set (or distribute) a camera function and a microphone function among the functions associated with video call and content execution to be performed in the electronic device.

In operation 1416, in a case in which a camera and a microphone are included in the TV, the processor 320 according to an embodiment may identify (or determine) whether an auxiliary camera function is included in the content.

In operation 1418, in a case in which the auxiliary camera function is not included in the content, the processor 320 according to an embodiment may set (or distribute) the camera function and the microphone function among the functions associated with video call and content execution to be performed in one of the electronic device and TV selected based on a designated condition. For example, the designated condition may be which of the camera specifications and the microphone specifications of each of the electronic device and the TV have higher performance than designated reference specifications, or which of the camera specifications and the microphone specifications of each of the electronic device and the TV has a higher performance.

In operation 1420, in a case in which an auxiliary camera function is included in the content, the processor 320 according to an embodiment activates the camera and the microphone of each of the electronic device and the TV, and may set (or distribute) a main camera and microphone function to be performed in one of the electronic device and the TV, and an auxiliary camera and microphone function to be performed in the other.

In operation 1422, the processor 320 according to an embodiment may identify (or determine) whether a video call sound and a content sound need to be simultaneously output.

In operation 1426, in a case in which the video call sound and the content sound need to be simultaneously output, the processor 320 according to an embodiment may set (or distribute) a video call sound output function to be performed in the electronic device and a content sound output function to be performed in the TV.

In operation 1428, in a case in which the video call sound and the content sound need not be simultaneously output, the processor 320 according to an embodiment may set (or distribute) all the video call sound output function and the content sound output function to be performed in the TV.

Figure 15:
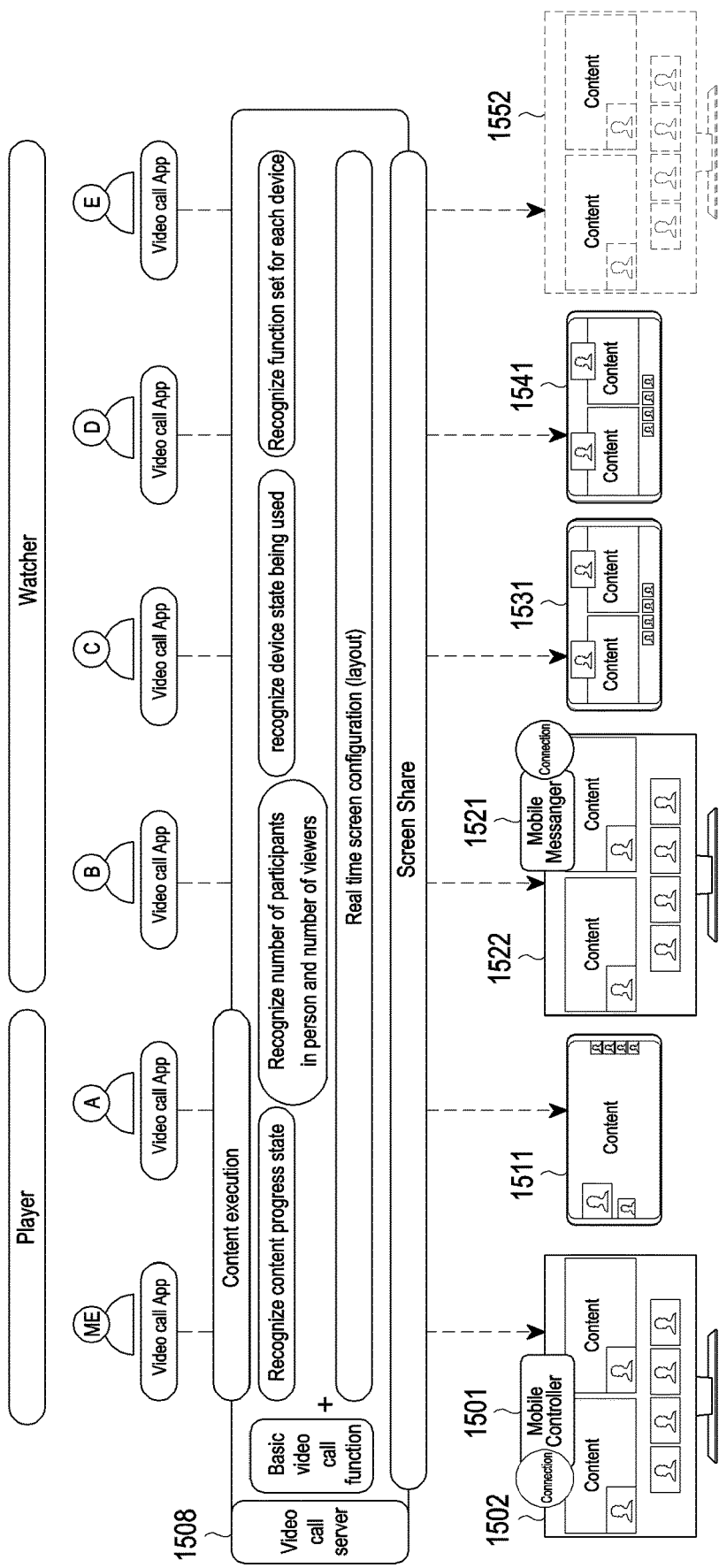
FIG. 15 is a diagram illustrating an example of operation performed in a case in which a video call server according to an embodiment configures a video call screen when a multilateral video call is performed, and provides the same to electronic devices of participants of the video call.

FIG. 15 is a diagram illustrating an example of operation performed in a case in which an example video call server according to an embodiment configures a video call screen when a multilateral video call is performed, and provides the same to electronic devices of participants of the video call.

Referring to FIG. 15, a video call server 1508 according to an embodiment may provide a multilateral video call service among video callers (e.g., ME, A, B, C, D, and E). In a case in which a first video caller (ME) executes content while performing a video call via an electronic device 1501 and an external electronic device 1502, and shares with (or relays to) a second video caller to a sixth video caller, the video call server 108 according to an embodiment may provide a video call and content execution screen to at least one electronic device for each of the first to sixth video callers (e.g., ME, A, B, C, D, E).

For example, in a case in which the first video caller (ME) executes and participates in content while performing a video call via an electronic device 1501 and an external electronic device 1502, a first video call and content execution screen may be provided based on a function distribution state (e.g., the state of a device currently used, a set function for each device) of the electronic device 1501 and the external electronic device 1502, and content context information (e.g., a content progress state, the number of participants in person and the number of viewers). For example, in a case in which a second video caller (A) participates content while performing a video call via an electronic device 1511, a second video call and content execution screen may be provided to the electronic device 1511 based on content context information (a content progress state, the number of participants in person, the number of viewers). For example, in a case in which the third video caller (B) watches content while performing a video call via an electronic device 1521 and an external electronic device 1522, a third video call and content execution screen may be provided to the electronic device 1521 and the external electronic device 1522 based on a function distribution state (e.g., the state of a device currently used, a set function for each device) and content context information (e.g., a content progress state, the number of participants in person and the number of viewers). For example, in a case in which the fourth video caller (C) and the fifth video caller (D) watch content while performing a video call via the electronic devices 1531 and 1541, respectively, the fourth and fifth video call and content execution screens may be provided to the electronic devices 1531 and 1541, respectively, based on content context information (a content progress state, the number of participants in person, the number of viewers). For example, in a case in which a sixth video caller (E) watches content while performing a video call via each external electronic device 1552, a sixth video call and content execution screen may be provided to the external electronic device 1552 based on content context information (a content progress state, the number of participants in person, the number of viewers).

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or a code executable by an interpreter. The machine-readable storage medium may be provided in the form of a non-transitory storage medium. The term "non-transitory" storage medium refers, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, a non-transitory computer-readable recording medium storing instructions that cause an electronic device to perform at least one operation when the instructions are executed by at least one processor of the electronic device is provided, and the at least one operation includes identifying an external electronic device connectable to an electronic device based on video calling and content execution, identifying at least one function executable in the external electronic device among functions associated with video calling and content execution, and identifying, based on device configuration information of the electronic device and device configuration information of the external electronic device, a function to be executed in the external electronic device among the at least one function executable in the external electronic device, and transmitting, to the external electronic device via the communication module, information corresponding to the function to be executed in the external electronic device.

An embodiment of the present disclosure provided in the present specifications and drawings merely are certain examples to readily describe the technology associated with embodiments of the present disclosure and to help understanding of the embodiment of the present disclosure, but may not limit the scope of the embodiments of the present disclosure. Therefore, in addition to the embodiment disclosed herein, the scope of an embodiment of the present disclosure should be construed to include all modifications or modified forms drawn based on the technical idea of an embodiment of the present disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
communication circuitry;
a display;
memory comprising one or more storage media storing instructions; and
at least one processor, including processing circuitry, connected to the communication circuitry, the display, and the memory,
wherein the instructions, when executed by the at least one processor individually or collectively, cause the electronic device to:
execute content while performing video calling; and
based on the executing of the content while performing the video calling:
identify an external electronic device connectable to the electronic device,
identify at least one function executable in the external electronic device among functions associated with the video calling and the content execution,
identify, based on device configuration information of the electronic device and device configuration information of the external electronic device, a function of displaying a video call screen and a content execution screen among the at least one function executable in the external electronic device,
identify a display layout of the video call screen and content execution screen based on context information of the content, and
transmit, to the external electronic device via the communication circuitry, based on the display layout of the video call screen and content execution screen, information corresponding to the function to be executed in the external electronic device for use by the external electronic device to perform the function.

2. The electronic device of claim 1, wherein the functions associated with the video calling and the content execution comprise functions associated with a video call and functions associated with content execution.

3. The electronic device of claim 2, wherein the functions associated with the video call comprise a video call screen display function, a selfie-camera function, a video call voice output function, and/or a microphone input function.

4. The electronic device of claim 2, wherein the functions associated with content execution comprise a content screen display function, a content sound output function, a content-related input function, a content-related camera function, and/or a content-related sensing function.

5. The electronic device of claim 1, wherein the device configuration information of the electronic device includes information associated with hardware components included in the electronic device, and the device configuration information of the external electronic device includes information associated with hardware components included in the external electronic device.

6. The electronic device of claim 1, wherein the context information comprises at least one of a content format, a content type, or a content progress state.

7. The electronic device of claim 1, wherein the instructions, when executed by the at least one processor individually or collectively, cause the electronic device to:
identify a change in the context information while a first video call and content execution screen is displayed in a first display layout, and
identify a second display layout based on the change in the context information.

8. The electronic device of claim 1, wherein the external electronic device includes a TV.

9. A method of performing, by an electronic device, a video call and content function using an external electronic device, the method comprising:
executing content while performing video calling; and
based on the executing of the content while performing the video calling:
identifying an external electronic device connectable to the electronic device;
identifying at least one function executable in the external electronic device among functions associated with the video calling and the content execution;
identifying, based on device configuration information of the electronic device and device configuration information of the external electronic device, a function of displaying a video call screen and a content execution screen among the at least one function executable in the external electronic device;
identifying a display layout of the video call screen and the content execution screen based on context information of the content; and
transmitting, to the external electronic device, based on the display layout of the video call screen and content execution screen, information corresponding to the function to be executed in the external electronic device via a communication circuitry of the electronic device for use by the external electronic device to perform the function.

10. The method of claim 9, wherein the functions associated with the video calling and the content execution comprise functions associated with a video call and functions associated with content execution.

11. The method of claim 10, wherein the functions associated with a video call comprise a video call screen display function, a selfie-camera function, a video call voice output function, and/or a microphone input function.

12. The method of claim 10, wherein the functions associated with content execution comprise a content screen display function, a content sound output function, a content-related input function, a content-related camera function, and/or a content-related sensing function.

13. The method of claim 9, wherein the device configuration information of the electronic device includes information associated with hardware components included in the electronic device, and the device configuration information of the external electronic device includes information associated with hardware components included in the external electronic device.

14. The method of claim 9, wherein the context information comprises at least one of a content format, a content type, or a content progress state.

15. The method of claim 9, wherein the method further comprises:

identifying a change in the context information while displaying a first video call and content execution screen in a first display layout, and
identifying a second display layout based on the change in the context information.

16. The method of claim 9, wherein the external electronic device includes a TV.

17. A non-transitory computer-readable recording medium storing instructions that, when executed by at least one processor of the electronic device, cause the electronic device to perform operations comprising:
executing content while performing video calling; and
based on the executing of the content while performing the video calling:
identifying an external electronic device connectable to the electronic device;
identifying at least one function executable in the external electronic device among functions associated with the video calling and the content execution;
identifying, based on device configuration information of the electronic device and device configuration information of the external electronic device, a function of displaying a video call screen and a content execution screen among the at least one function executable in the external electronic device;
identifying a display layout of the video call screen and the content execution screen based on context information of the content; and
transmitting, to the external electronic device, based on the display layout of the video call screen and content execution screen, information corresponding to the function to be executed in the external electronic device via a communication circuitry of the electronic device for use by the external electronic device to perform the function.

18. The non-transitory computer-readable recording medium of claim 17, wherein the functions associated with the video calling and the content execution comprise functions associated with a video call and functions associated with content execution,
the functions associated with the video call comprise a video call screen display function, a selfie camera function, a video call voice output function, and/or a microphone input function, and
the functions associated with content execution comprise a content screen display function, a content sound output function, a content-related input function, a content-related camera function, and/or a content-related sensing function.

* * * * *